US011823348B2

(12) United States Patent
Moens

(10) Patent No.: US 11,823,348 B2
(45) Date of Patent: Nov. 21, 2023

(54) METHOD AND SYSTEM FOR TRAINING GENERATIVE ADVERSARIAL NETWORKS WITH HETEROGENEOUS DATA

(71) Applicant: BARCO N.V., Kortrijk (BE)

(72) Inventor: Karel Jan Willem Moens, Roeselare (BE)

(73) Assignee: BARCO N.V., Kortrijk (BE)

( * ) Notice: Subject to any disclaimer, the term of this patent is extended or adjusted under 35 U.S.C. 154(b) by 178 days.

(21) Appl. No.: 17/595,371

(22) PCT Filed: May 17, 2019

(86) PCT No.: PCT/EP2019/062880
§ 371 (c)(1),
(2) Date: Nov. 15, 2021

(87) PCT Pub. No.: WO2020/233779
PCT Pub. Date: Nov. 26, 2020

(65) Prior Publication Data
US 2022/0215504 A1 Jul. 7, 2022

(51) Int. Cl.
G06T 3/00 (2006.01)
G06T 7/70 (2017.01)
G06V 10/774 (2022.01)
G06N 3/045 (2023.01)

(52) U.S. Cl.
CPC .......... *G06T 3/0093* (2013.01); *G06N 3/045* (2023.01); *G06T 7/70* (2017.01); *G06V 10/7747* (2022.01); *G06T 2207/30041* (2013.01)

(58) Field of Classification Search
None
See application file for complete search history.

(56) References Cited

U.S. PATENT DOCUMENTS

| 10,373,026 | B1* | 8/2019 | Kim ..................... G06N 3/047 |
| 10,540,578 | B2* | 1/2020 | Madani ............... G06V 10/774 |
| 10,937,540 | B2* | 3/2021 | Madani ................ G06N 3/045 |
| 11,087,215 | B1* | 8/2021 | Chen ..................... G06N 3/08 |
| 11,449,707 | B2* | 9/2022 | Yang .................... G06V 10/82 |
| 2018/0336471 | A1* | 11/2018 | Rezagholizadeh .... G06N 3/047 |

FOREIGN PATENT DOCUMENTS

WO 2018184187 10/2018

OTHER PUBLICATIONS

International Search Report and Written Opinion issued in PCT/EP2019/062880, dated Mar. 11, 2020, 14 pages provided.

(Continued)

*Primary Examiner* — Martin Mushambo
(74) *Attorney, Agent, or Firm* — HAMRE, SCHUMANN, MUELLER & LARSON, P.C.

(57) ABSTRACT

A method and system for training a neural network to perform processing of digital data. The input data can be heterogeneous and the method or system obtains a multiple of loss signals. The input data can be selected so that the loss signals are balanced and can fulfill several conditions of the output data. When running a trained neural network on digital frame images, intermediate results of processing a frame can be used on later frames and in this way processing delay can be decreased.

20 Claims, 10 Drawing Sheets

(56) References Cited

OTHER PUBLICATIONS

Ganin et al., "DeepWarp: Photorealistic Image Resynthesis for Gaze Manipulation", European Conference on Computer Vision, 2016, p. 311-326, XP00279753, cited in the specification.
Giger et al., "Gaze correction with a single webcam", 2014 IEEE International Conference on Multimedia and Expo, ICME, Jul. 2014, XP002797532, cited in Specification.
Wood et al., "GazeDirector: Fully Articulated Eye Gaze Redirection in Video", Computer Grphics forum (vol. 37, No. 2, pp 217-225), May 2018, XP002797533, cited in Specification.
Kononenko et al., "Semi-Supervised Learning for Monocular Gaze Redirection", 13th IEEE International Conference on Automatic Face & Gesture Recognition (FG 2018), XP002797534, cited in Specification.
Dolhansky et al., "Eye In-Painting with Exemplar Generative Adversarial Networks", 2Proceedings of the IEEE conferences on computer vision and pattern recognition (pp. 7902-7911), 2018, XP002797535, cited in Specification.
Bulat et al., "How far are we from solving the 2D & 3D Face Alignment problem? (and a dataset of 230,000 3D facial landmarks)", available at https://www.adrianbulat.com/downloads/FaceAlignment/FaceAlignment.pdf, Computer Vision Laboratory, The University of Nottingham, Nottingham, United Kingdom, Sep. 7, 2017, 14 pages provided, cited in Specification.
Zadeh et al., "Convolutional Experts Network for Facial Landmark Detection", available at https://arxiv.org/pdf/1611.08657.pdf, Jul. 26, 2017, 10 pages provided, cited in Specification.
Cao et al., "OpenPose: Realtime Multi-Person 2D Pose Estimation using Part Affinity Fields", IEEE Transactions on Pattern Analysis and Machine Intelligence, May 30, 2019, available at https://arxiv.org/pdf/1812.08008.pdf, 14 pages provided, cited in Specification.
Faceplusplus, available at https://www.faceplusplus.com/landmarks/, cited in Specification (accessed Nov. 15, 2021).
Rezagholizadeh et al., "Semi-supervised Regression with Generative Adversarial Networks for End to End Learning in Autonomous Driving", ICLR 2018 Conference Withdrawn Submission, Feb. 27, 2018, 9 pages provided, cited in Specification.

\* cited by examiner

METHOD AND SYSTEM FOR TRAINING GENERATIVE ADVERSARIAL NETWORKS WITH HETEROGENEOUS DATA

The present invention relates to a method and system for training generative adversarial networks with heterogeneous data as well as a computer program product for carrying out the method. The present invention also relates to a method and system to maintain the impression of eye-contact in video conferencing. The present invention also relates to a method and system to warp pixels in images.

BACKGROUND

Video conferencing has been around for over a decade and is today a common means of communication. Yet the technology has shortcomings that make people shy away in favor of face-to-face conversation, for example the inability to maintain eye-contact.

Ganin (Ganin et. al, European Conference on Computer Vision, 2016, pages 311-326) describes training a neural network to shift pixels in a photograph of an eye, thus changing the gaze direction by a given angle. For training, they collected their own data set by fixating subjects in front of cameras and having them look at appearing dots. Such a data collection procedure made it possible to sample pairs of images of the same eye with different gaze directions. Kononenko (Kononenko et. al., 13th IEEE International Conference on Automatic Face & Gesture Recognition (FG 2018), 2018, 535-539) continued this work and allowed the use of just any pair of images of the same eye, without knowing the exact gaze directions of the images. Both Ganin and Kononenko use homogeneous data sets. In order to train warping methods like these, sequences of images of eyes need to be collected where the person and his/her head pose remain fixed while his/her gaze direction varies. Even when not all of these images need to be labeled with their absolute gaze, as for Kononenko, this is an expensive process that results in a relatively small data set w.r.t. current benchmark sets in deep learning.

Giger (Giger et al., 2014 IEEE International Conference on Multimedia and Expo (ICME), Chengdu, 2014, 1-6) tilts the entire face to make it seem as if the person were facing his/her camera. This approach either needs to map the pixels as a texture onto a 3D head model, or it only affects the face and not the contours of the head, therefore changing the proportions of the person. Either way, these methods require a more complex detection of the head and deliver more noticeable failure in the final image.

Dolhansky (Dolhansky et al., "Eye In-Painting with Exemplar Generative Adversarial Networks." 2017) and Wood (Wood et al., "GazeDirector: Fully Articulated Eye Gaze Redirection in Video" 2017) discloses the generation of new eyes which replace the originally inputted eyes. To open the new eyes, exemplary images are used together with generative adversarial networks (GANs).

The system of Wood matches the eyes and the region around them to a 3D model. The gaze direction of this model can then be modified before blending it onto the original face.

The disadvantage of discarding the originally inputted eyes is that there may be a drop in video realism and/or loss of effect of eye movement. Attempts to train sequentially on different datasets avoids dealing with competing goals. But with reference to gaze warping, training first on a synthetic data set and then on real images like photos, would mean first learning to make large corrections and only afterwards learning to keep these corrections realistic, at the risk of forgetting how to make the original corrections.

SUMMARY OF THE INVENTION

Embodiments of the present invention relate to a method and system for training generative adversarial networks with heterogeneous data as well as a computer program product for carrying out the method.

In another aspect embodiments of the present invention relate to a method and system to maintain the impression of eye-contact in video conferencing.

In another aspect the embodiments of the present invention relate to a method and system to warp pixels in images.

In one aspect of the present invention embodiments of the present invention provide a method for training a neural network by adapting weight values of nodes of the neural network, the neural network having output nodes.

The method can comprise storing digital images of a first data type being pairs of input- and target digital real images, a second data type being pairs of input- and target digital synthetic images, and a third data type being input unlabeled digital real images, whereby each image is represented by pixels, the pixels having pixel properties.

The method can comprise processing the digital images of the first data type, the second data type and the third data type;
  the processing comprising a step of creating one or more loss signals by, for example:
    modifying each input image of the first, second and third data types to form modified digital images of the first, second and third data types,
    obtaining output values in the output nodes by processing pixels of the modified digital images through the neural network,
    obtaining loss signals
    for the first data type by using all output nodes,
    for the second data type by using at least one of the output nodes, and
    for the third data type by using at least one of the output nodes, so that the second and third data types are together using all of the output nodes.

The processing can comprise a step of combining the loss signals from digital images of each of the first, second and third data types into a combined loss signal:
  the processing comprising a step of updating the weight values of the neural network by back propagating the combined loss signal through the neural network; and
  the processing comprising a step of storing the updated weight values.

The step of creating one or more loss signals can additionally comprise:
  for each modified digital image of the first and second data types, residing in the output nodes,
  creating a loss signal using all output nodes, and the pixel values of the target digital image.

The step of creating one or more loss signals can additionally comprise:
  for each modified digital image,
  processing the modified digital image through the network using reverse modification to obtain in the output nodes a reversely modified digital image;
  for each data type, creating a loss signal using the output nodes, and the pixel values of unmodified digital image.

The step of creating the one or more loss signals can additionally comprise:
for each modified- and reference digital image of the first and third data types,
for each output digital image, having a trained adversarial network, estimating each modified- and reference digital image
by assigning a first and second numerical output value in the output nodes, respectively,
and creating the loss signal as the difference between the first output value and the second output value.

For each unmodified- and modified digital image of the third data type it is preferred
To have a trained adversarial network estimating each unmodified- and modified digital image,
assigning a first and second numerical output value in the output nodes, respectively, and creating the loss signal as the difference between
the first numerical output value plus an input correction value, and the second output value.

The method can comprise any of pre-processing, interleaving or shuffling of all input data sets before constructing an input data batch by sampling.

The method can comprise creating a mapping between the values in the output nodes and the target digital image.

In another aspect embodiments of the present invention provide warping digital images for use with a system having means for processing and a non-volatile memory,
the system being adapted to define facial landmarks of digital images.
The method can comprise:
receiving digital images;
the means for processing receiving a frame image number x
detecting the image pixel coordinates of the facial landmarks on the image and sending the image pixel coordinates to a neural network,
the neural network being adapted to generate a warp field;
applying the warp field onto the frame image number x;
outputting the warped frame image number x on the display;
and for at least one frame image number x+n, n>=1;
using the warp field obtained from frame image number x;
and for at least one frame image number x+m, m>=n+1,
using the facial landmarks obtained from frame image number x+n.

This method can comprise reading input data sets, wherein the input data sets are a heterogeneous set of data. The heterogeneous set of data can comprise any some or all of labeled photo pairs, labeled CGI pairs, and unlabeled photos.

The method can comprise any of interleaving or shuffling all input data sets before constructing an input data batch by sampling.

When multiple types of data sets are present, each data set can have equal influence on gradients, in which case they appear equally frequently in the batches, regardless of data set size.

To achieve appearing equally, all input data sets before shuffling can be interpreted as an interleaved union of the repeated data sets, in which samples from each data set follow each other alternately and can be reused when a data set runs out of samples.

This method can comprise performing a first modification pass, on the labeled data pairs which comprise input- and target images.

Supervised loss signals can be calculated.

Performing the first modification pass can also be carried out on the unlabeled data, but no supervised loss signal needs to be calculated for it.

A modifying network can be adapted to receive the input data and a correction angle.

A means for processing, can provide, for example, the different types of data to the modifying network The modifying network can be adapted to warp pixels of the input images with a correction angle.

The method can include expressing the loss signal by an L-distance calculated between pixel values of the warped image and the target image.

The method can include storing an intermediate loss signal in a memory.

The method can comprise performing a reverse modification pass wherein the input data sets can be provided by output data from the first modification pass of the labeled data and the unlabeled data.

Target data can be the original labeled input data, and unlabeled input data.

A correction angle can be the reverse correction angle.

An L-distance loss signal can be calculated in the reverse modification pass as in the first modification pass. The resulting loss signal can be the cycle loss signal of the training signal.

The reverse modification pass can stimulate the neural network to model a reversible function from eye images to eye images.

The intermediate loss signal can be stored in a memory.

In the method an adversary evaluation pass can comprise an adversarial network receiving the output from the first modification pass.

The modified images can be sent through the adversarial or discriminating network for estimation, and depending on the data type, different loss signals can be calculated.

An adversarial loss signal can be calculated for modified labeled photographs.

Based on the result a decision can be made whether the adversarial network estimates the images to be real or fake.

A gaze angle regression loss signal can be calculated. The gaze angle regression loss signal can be used to decide whether the adversarial network estimates the gaze angle to be the target angle.

For example, the gaze angle regression loss signal can be calculated for the modified labeled CGI's.

The gaze angle regression loss signal can be used to decide whether the adversarial network estimates the gaze angle in the modified image to be the target angle.

An adversarial loss signal can be calculated for the unlabeled photographs whereby the result can be used to decide whether the adversarial network estimates the images to be real or fake.

The method can include sending original unlabeled photographs through the adversarial network to be estimated.

A warped image can be sent to the adversarial network to be estimated.

The loss signal can be calculated as the difference between the estimated angle of the original unlabeled photographs plus the correction angle, and the estimated angle of the warped photographs.

The calculated loss signals can be given a numerical score, or an alphanumeric score, for example, on the realism of the photograph outputs. The scores for real images can be trained to be larger or of a higher value than scores for modified images to create a differentiation between the different image types.

In the method loss signal aggregation and refinement can comprise:
all previously calculated loss signals are weighted and summed into a composed or combined loss signal.

A gradient of the loss signal can be propagated back to the modifying network.

Fully training a generative adversarial network can be done, for example, when all included loss signals have converged.

Training of an adversarial network is preferably done while the parameters of the modifying network are kept fixed.

An image evaluation pass can comprise: all input images are sent through the modifying network and the output is differentiated depending on their original type.

For the unlabeled photographs, only the adversarial loss signal needs to be calculated, this loss signal giving a measure of whether the image is real or fake.

A modifying network has preferably been trained and is used in operation.

Intermediate results can be used in order to decrease processing delay.

Any of the methods of embodiments of the present invention can comprise an unoptimized sequential process wherein a camera frame image number x is sent from a local means for processing to a cloud server or other means for processing and facial landmark coordinates are detected and added to the image.

The frame image with the facial landmarks can be sent to the trained modifying neural network, which calculates a warp field and can apply it on the eye region of the frame image.

A cloud server or other means for processing can host the neural network.

A warped image can be sent back from a cloud server or means for processing to the local means for processing, which can then output a final image frame.

A number of frames in processing rows such as four frames in four processing rows can be processed, for example in parallel so that later processing rows can use results of a previous processing row or rows.

Processing of the first row can start with the sending of a first camera frame image from a local means for processing to the cloud server or means for processing.

Facial landmark detection can be performed and facial landmark coordinates can be defined.

Processing the next row such as the second row can in the meantime be started on a second frame image, which is the image of frame number x+n where n>=1. The second frame image can be sent from the local means for processing to the cloud server or means for processing.

Instead of defining the facial landmark coordinates of the second frame image, the facial landmark coordinates of a first frame image can be used.

The modifying neural network can receive the second frame image and the facial landmark coordinates of the first frame image, and can calculate a warp field which is sent back from the cloud server or means for processing to the local means for processing.

Processing the next row such as the third row can in the meantime be started by sending third frame image number x+m, m>=n+1, to the cloud server or means for processing.

The facial landmark detection can be performed and the facial landmark coordinates of the third frame image can be sent from the cloud server or the means for processing to the local means for processing.

Processing of the next row such as the fourth row can in the meantime be started on the local means for processing with the fourth frame image number x+q, q>=m+1.

The warp field can already have been received based on the second frame image and the first frame image and facial landmarks based on the third frame image. These can be used to warp the next frame image such as to warp the fourth frame image into a fifth frame image.

A setting can be made which determines how far apart the frames can be that are used for calculation and display of the landmark coordinates and warping.

The method can receive labeled and unlabeled data that have been modified by a modifying network.

Parameters of the modifying network can be kept fixed, while an adversarial network is trained to estimate each data.

Estimating each data can comprise calculating a score for the data without needing to know whether it is real or modified.

A higher score or a score with a higher value can be calculated for real data and a lower score or lower value for modified data.

When training the modifying network, the adversarial network can already be trained to give high scores or higher values for unmodified data, and low scores for modified data. The parameters of the adversarial network are now kept fixed, whereby the modifying network can then modify data and send it to the adversarial network. This scores the data, whereby parameters of the modifying neural network can then be adapted (in several iterations) until the score reaches a desired value.

Scores for all real- and modified data respectively can be aggregated. Aggregating can include calculating the mean for the respective data type set.

A loss signal for the adversarial network can be provided from the distance between the aggregated score of the real data and the aggregated score of the modified data.

In a further aspect embodiments of the present invention can provide a system for training a neural network by adapting weight values of nodes of the neural network, the neural network having output nodes.

The system can comprise:
a store for digital images of a first data type being pairs of input- and target digital real images, a second data type being pairs of input- and target digital synthetic images, and a third data type being input unlabeled digital real images,
whereby each image is represented by pixels, the pixels having pixel properties.

The system can comprise a processor or means for processing the digital images of the first data type, the second data type and the third data type.

The processor can be adapted to create one or more loss signals by:
modifying each input image of the first, second and third data types to form modified digital images of the first, second and third data types,
obtaining output values in the output nodes by processing pixels of the modified digital images through the neural network,
obtaining loss signals
for the first data type by using all output nodes,
for the second data type by using at least one of the output nodes, and
for the third data type by using at least one of the output nodes, so that the second and third data types are together using all of the output nodes;

the processor being adapted to combine the loss signals from digital images of each of the first, second and third data types into a combined loss signal:

the processor being adapted to update the weight values of the neural network by back propagating the combined loss signal through the neural network; and the processor being adapted to store the updated weight values.

The processor can be adapted, for each modified digital image of the first and second data types, residing in the output nodes, to create a loss signal using all output nodes, and the pixel values of the target digital image.

The processor can be additionally adapted:

for each modified digital image, to process the modified digital image through the network using reverse modification to obtain in the output nodes a reversely modified digital image; and for each data type, to create a loss signal using the output nodes, and the pixel values of unmodified digital image.

The processor can be adapted additionally:

for each modified- and reference digital image of the first and third data types, for each output digital image, having a trained adversarial network, to estimate each modified- and reference digital image by assigning a first and second numerical output value in the output nodes, respectively, and to create the loss signal as the difference between the first output value and the second output value.

The system can comprise:

for each unmodified- and modified digital image of the third data type, a trained adversarial network for estimating each unmodified- and modified digital image, for assigning a first and second numerical output value in the output nodes, respectively, and for creating the loss signal as the difference between the first numerical output value plus an input correction value, and the second output value.

The system can be adapted for any of pre-processing, interleaving or shuffling of all input data sets before constructing an input data batch by sampling.

The system can be adapted to create a mapping between the values in the output nodes and the target digital image.

In another aspect, embodiments of the present invention can provide a system for warping digital images, wherein the system can comprise a processor or means for processing and a non-volatile memory.

The system can be adapted to define facial landmarks of digital images.

The system can be adapted to receive digital images.

The processor or means for processing can be adapted to receive a frame image number x, to detect the image pixel coordinates of the facial landmarks on the image and to send the image pixel coordinates to a neural network, whereby the neural network can be adapted to generate a warp field;

and to apply the warp field onto the frame image number x;

to output the warped frame image number x on the display;

and for at least one frame image number x+n, n>=1;

to use the warp field obtained from frame image number x;

and for at least one frame image number x+m, m>=n+1, by using the facial landmarks obtained from frame image number x+n.

The system can be adapted to read input data sets, wherein the input data sets are a heterogeneous set of data.

The heterogeneous set of data can comprise labeled photo pairs, labeled CGI pairs, and unlabeled photos.

The system can be further adapted, that there is interleaving or shuffling of all input data sets before constructing an input data batch by sampling.

When multiple types of data sets are present, each data set can have equal influence on gradients, in which case they appear equally frequently in the batches, regardless of data set size.

The system can be adapted to achieve appearing equally, by all input data sets before shuffling being interpreted as an interleaved union of the repeated data sets, in which samples from each data set follow each other alternately and can be reused when a data set runs out of samples.

The system can be further adapted to perform a first modification pass, on the labeled data pairs which comprise input- and target images.

The system can be adapted so that supervised loss signals are calculated.

The system can be adapted so that performing the first modification pass is also carried out on the unlabeled data, but no supervised loss signal is calculated for it.

The system can comprise a modifying network adapted for receiving the input data and a correction angle.

A means for processing or a processor can provide the different types of data to the modifying network The modifying network can be adapted to warp pixels of the input images with a correction angle.

The system can be further adapted to express the loss signal by an L-distance calculated between pixel values of the warped image and the target image.

The system can further comprise a memory for storing an intermediate loss signal.

The system can be adapted to perform a reverse modification pass comprising the input data sets being provided by output data from the first modification pass of the labeled data and the unlabeled data.

Target data can be original labeled input data, and unlabeled input data.

A correction angle can be the reverse correction angle.

An L-distance loss signal can be calculated as in the first modification pass.

The resulting loss signal can be the cycle loss signal of the training signal.

The reverse modification pass can be adapted to stimulate the neural network to model a reversible function from eye images to eye images.

The system can further comprise a memory in which the intermediate loss signal is stored.

An adversary evaluation pass can comprise an adversarial network receiving the output from the first modification pass.

The system can be adapted so that modified images are sent through the adversarial or discriminating network for estimation, and depending on the data type, different loss signals are calculated.

The system can be adapted to calculate an adversarial loss signal for modified labeled photographs.

Based on the result, the adversarial network can be adapted to estimate whether the images to be real or fake.

A gaze angle regression loss signal can be calculated.

The system can be adapted to use the gaze angle regression loss signal results to decide whether the adversarial network estimates the gaze angle to be the target angle.

The gaze angle regression loss signal can be calculated for the modified labeled CGI's.

The system can be adapted to use the gaze angle regression loss signal to decide whether the adversarial network estimates the gaze angle in the modified image to be the target angle.

The system can be adapted to calculate an adversarial loss signal for the unlabeled photographs.

The system can be further adapted to use the result to decide whether the adversarial network estimates the images to be real or fake.

The system can be further adapted to send original unlabeled photographs through the adversarial network to be estimated.

The system can be adapted to send a warped image to the adversarial network to be estimated.

The system can be adapted to calculate the loss signal as the difference between the estimated angle of the original unlabeled photographs plus the correction angle, and the estimated angle of the warped photographs.

The system can be adapted to give the calculated loss signals, a numerical score on the realism of the photograph outputs.

The system can be adapted so that scores for real images are trained to be larger than scores for modified images to create the differentiation.

The system can be adapted so that for loss signal aggregation and refinement:
all previously calculated loss signals are weighted and summed into a composed or combined loss signal.

The system can be adapted to propagate a gradient of the loss signal back to the modifying network.

The system can be adapted to fully train a generative adversarial network when all included loss signals have converged.

The system can be adapted to train an adversarial network while the parameters of the modifying network are kept fixed.

An image evaluation pass can comprise: all input images can be sent through the modifying network and the output can be differentiated depending on their original type.

The system can be adapted to calculate for the unlabeled photographs, only the adversarial loss signal, this loss signal giving a measure of whether the image is real or fake.

The system can include a modifying network which can be trained and can be used in operation.

The system can be adapted to use intermediate results in order to decrease processing delay.

The system can be adapted for an unoptimized sequential process wherein a camera frame image number x is sent from a local means for processing to a cloud server or other means for processing and facial landmark coordinates are detected and added to the image.

The frame image with the facial landmarks can be sent to the trained modifying neural network, which can calculate a warp field and can apply it on the eye region of the frame image.

The system can be adapted to host a cloud server or other means for processing the neural network.

The system can be adapted to send back the warped image from a cloud server or means for processing to the local means for processing, which is adapted to output a final image frame.

The system can be adapted to process a number of frames in a number of processing rows such as four frames in four processing rows in parallel so that later processing rows can use results of previous processing rows.

The system can be adapted to start processing a row such as the first row by sending a first camera frame image from a local means for processing to the cloud server or means for processing.

The system can be adapted to perform facial landmark detection and to define facial landmark coordinates.

The system can be adapted to start processing of a next row such as processing the second row in the meantime on a second frame image, which is the image of frame number $x+n$ where $n>=1$.

The system can be adapted to send the second frame image from the local means for processing to the cloud server or means for processing.

Instead of defining the facial landmark coordinates of the second frame image the facial landmark coordinates of a first frame image can be used.

The modifying neural network can be adapted to receive the next frame image such as the second frame image and the facial landmark coordinates of the first frame image or other previous image, and is adapted to calculate a warp field which is sent back from the cloud server or means for processing to the local means for processing.

The system can be adapted to start the processing of another row such as the third row by sending third frame image number $x+m$, $m>=n+1$, to the cloud server or means for processing.

The system can be adapted to perform The facial landmark detection and to send the facial landmark coordinates of the third frame image from the cloud server or the means for processing to the local means for processing.

The system can be adapted to start processing the next row such as processing of the fourth row on the local means for processing with the fourth frame image number $x+q$, $q>=m+1$.

The system can be adapted so that the warp field has already been received based on the second frame image and the first frame image and facial landmarks based on the third frame image, these can be used to warp the fourth frame image into a fifth frame image.

The system can be adapted to make a setting which determines how far apart the frames can be that are used for calculation and display of the landmark coordinates and warping.

The system can be adapted to receive labeled and unlabeled data that have been modified by a modifying network.

The system can be adapted to keep parameters of the modifying network fixed, while an adversarial network is trained to estimate each data.

The system can be adapted to estimate each data by calculating a score for the data without needing to know whether it is real or modified.

The system can be adapted to calculate a higher score or a higher value for real data and a lower score or lower value for modified data.

The system can be adapted so that when training the modifying network the adversarial network can already be trained to give high scores or values for unmodified data, and low scores or low values for modified data.

The system can be adapted so that the parameters of the adversarial network can now kept fixed and the modifying network can be adapted to then modify data and send it to the adversarial network, which scores the data.

The system can be adapted so that the parameters of the modifying neural network can then be adapted (in several iterations) until the score reaches a desired value.

The system can be adapted to aggregate scores for all real- and modified data respectively The system can be adapted so that aggregating includes calculating the mean for the respective data type set.

The system can be further adapted to provide a loss signal for the adversarial network from the distance between the aggregated score of the real data and the aggregated score of the modified data.

Embodiments of the present invention can provide a computer program product that when executed on a processor carries out any of the methods of the present invention.

A non-transitory machine readable signal storage medium can be provided that stores the computer program product. This can be an optical disk such as a CDROM or DVD-ROM, a hard disk, a flash memory, a solid state non-volatile memory, a magnetic tape or similar.

DEFINITIONS

Figure 1:
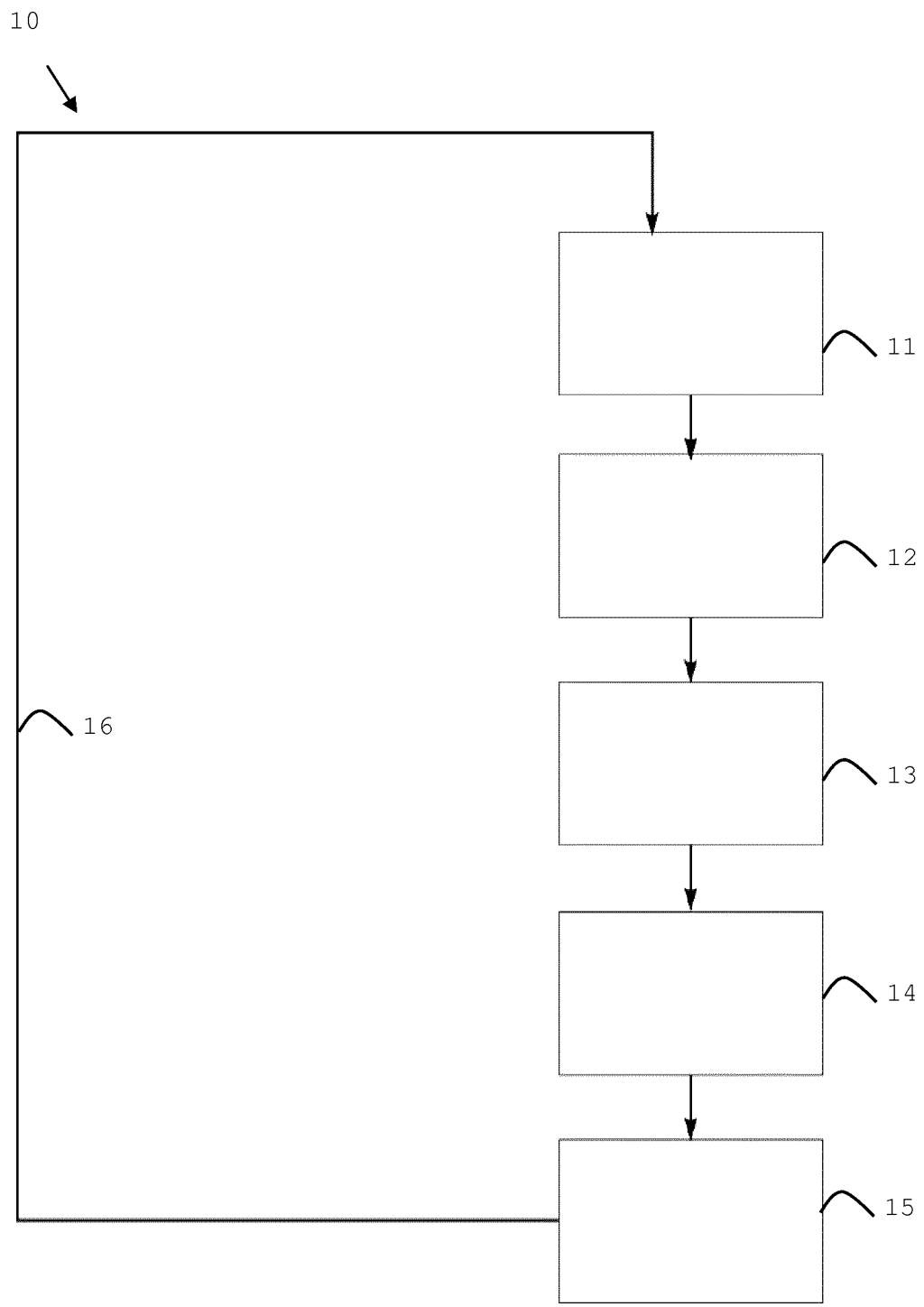
FIGS. 1 to 6 show flow charts of an embodiment of the present invention comprising steps of training a modifying neural network.

A "neural network" is a computer architecture wherein a number of network processing nodes are implemented on at least one computer processor, and interconnected with each other in a way that can be said to mimic the neurons of a human brain. Each processor can host the computation nodes of a neural network. Each node can have an input with a weight value which defines how digital information sent to the node will be processed. A node can have several inputs but normally only one output. These weights can be adjusted when training the neural network. Initially these weights values can be random. The nodes can be seen as reference points connected by the weights, and digital data can be sent through the nodes following a certain route or sequence or graph or network architecture, and be processed accordingly. Hence, a neural network provides a graph describing calculations performed by a computer processor. Processing in parallel branches of the node network may be performed simultaneously, depending on the hardware.

The nodes, the weights and the sequence of nodes can be stored on a non-volatile memory. When the neural network processes digital images, it can work on signals of the digital images, for example color points or brightness, which in turn can be represented by digital driving levels (e.g. driving currents). In a fully connected neural network, all nodes are connected to each other.

"Generative adversarial networks" (GANs) can comprise two neural networks where one is generative (or modifying) and one is adversarial (or discriminative). The generative neural network (or "generative network" or "modifying network") can generate or modify data, which can then be given as input to the adversarial neural network (or "adversarial network" or "discriminative network"). The adversarial network can then discriminate between generated (or modified) data and real or unmodified data. This can sometimes be referred to as "fake" or "real" data, respectively, and this separation can be seen as a classification problem.

The outcome of the adversarial network can then be used to adapt the parameters of the generative network. The networks are trained alternately so that the parameters are kept fixed for the network that is not being trained. Both generative- and adversarial neural networks can be convolutional neural networks.

For example, when training the modifying network the adversarial network can already be trained to give high scores for unmodified data, and low scores for modified data. The parameters of the adversarial network are now kept fixed. The modifying network can then modify data and send it to the adversarial network, which scores the data. The parameters of the modifying neural network can then be adapted (in several iterations) until the score reaches a desired value. For example, if realistic images is desired, the parameters of the modifying network are adapted until the adversarial network scores the modified images to be real images.

The training of the adversarial network can comprise that it receives labeled and unlabeled data that have been modified by the modifying network. The parameters of the modifying network are now kept fixed. The adversarial network estimates each data, i.e. calculates a score for the data (without knowing whether it is real or modified), for example, it can give higher score for real data and lower scores for modified data. The scores for all real- and modified data can then be aggregated respectively (e.g. by calculating the mean for the respective data type set).

A loss signal (or training signal) for the adversarial network can then be the distance between the aggregated score of the real data and the aggregated score of the modified data. The adversarial network can be trained/encouraged to output higher scores for real data than for modified data. Optionally, it is possible to let the adversarial network classify the images with a confidence in the interval [0,1.0].

Hence, the two networks can train each other. In fact, the networks can be said to compete in a zero-sum game wherein the generative (or modifying) network attempts to "fool" the adversarial (or discriminative) network: The modifying network will try to produce modified data that the adversarial network will score as real data. The networks can provide each other with feed-back, and they can learn to mimic a data distribution when given unlabeled input data.

The data sets can be generalized to
Labeled: perfect but small data set
Synthetic: abundant, controlled data set, dissimilar input/output
Unlabeled: abundant, uncontrolled data set, similar input/output An example of an embodiment of this that doesn't involve pixels could be speech to text:
Labeled: transcriptions
Synthetic: robotic readings of text
Unlabeled: unlabeled speech+unrelated dialogues (a discriminative network checks if the output text resembles actual dialogues).

All three data sets can be used for training at the same time, in the same batches.

A "gradient descent" is an iterative optimization algorithm where the task is to minimize an objective function that can describe e.g. a difference between an obtained value and a target or reference value. At a point on the function, a step is taken that is proportional to the negative derivative of the curve's gradient in the point. This will lead to the minimum of the function.

"Stochastic Gradient Descent" or "SGD" uses an approximate gradient which reduces the risk of ending up in a local minimum, as well as it prevents strong zig-zag behaviour. Hence, SGD speeds up convergence and is suitable for large data sets. A neural network can be trained by using SGD regression.

Alternative methods can be the use of e.g. Alternating Direction Method of Multipliers, Evolution Strategies or Synthetic Gradients.

The above mentioned difference can also be referred to as a "loss signal".

A "loss signal" can be the difference between an estimated data value (or modified data value, or output data value) of the neural network and the reference- or target data value. The loss signal can be calculated by a processor that manages the neural network. The neural network can be represented as a function of all weights where each weight $a_{ji}$ can be multiplied by an input $x_j$, for example $$z_i = a_{1i}x_1 + a_{2i}x_2 + \ldots + a_{ji}x_j + b_i, \quad (1)$$

where there are i nodes, j node inputs and an off-set or bias $b_i$. The expression (1) are in most cases valid per layer (an index for layer may be added to the expression).

The output nodes are the nodes where the output values are retrieved, this can for example be the nodes in the last layer of the neural network.

When input data is sent through the neural network it can be processed by all weights according to the node connections, to obtain a related output data. The output data of a node can be a non-linear function of the sum of all of its inputs, $z=f(z_i)$. For example, in supervised training of a neural network, there can be a reference output data available. The weights can be adapted iteratively until a known input gives the available output, hence, the neural network is trained. By working with optimization based on derivatives, e.g. gradient descent, a certain direction of the training can be encouraged by using a preferred direction of the weight adaptations. For example, in gradient descent methods, the next step can be proportional to the negative gradient of the function at the present location.

The difference between the obtained output and the reference value or data or image can be referred to as a "loss signal". A target can be a reference. For example, for a reference value R, a loss signal could be the distance $\|R-Z\|$, where Z is a vector comprising $(f(z_{l1}), \ldots, f(z_{lp}))$, where l is the last layer having p nodes. These nodes can be referred to as the output nodes.

A loss signal can also comprise the output of at least one but less than p nodes.

Hence, a loss signal can be an expression with the same amount of terms as there are weights in the neural network. Deep neural networks have a multiple of layers of nodes and all weights of one layer are first adapted/processed before any weight in the following layer is adapted/processed. All layers between the first layer or input layer and the last layer or output layer, can be referred to as hidden layers. The weights of the neural network can be adapted by letting the loss signal be "back propagated" through the network, one layer at the time. This means that the weights are increased in the negative direction of the gradient of the loss signal or loss function expression.

The loss signal value can also be calculated as a floating point number for each iteration. A predefined limit can be set for the variation of this value, and used to define the convergence of the optimization.

For example, if the input data is an image, the $x_j$ can comprise pixel values and the image can be represented as X being an N×M×P matrix with N and M the height and width of the image (e.g. expressed in pixels) and P can be the number of variables describing a pixel through its property, e.g. color.

For example, X can then be M×N×3 where each $x_j$ can comprise red, green and blue color values. A reference image R can be expressed as an N×M×P matrix. The last layer of the neural network can be configured to have N×M×3 nodes so that a loss signal can be created. The nodes of the last layer can be referred to as the output nodes. Alternatively, if the output from the neural network is of another format, the output can be transformed into the format of the reference data or image. The neural network can then be trained so that the outputs from the last neural network nodes (or a transformation of them) converges towards R, e.g. by minimizing the loss signal.

A neural network can be trained to obtain continuous values, e.g. the reference data can comprise a range of decimal numbers. In this case the loss signal can be seen as an error signal. If a neural network is trained for providing realistic outputs, the output can be a real number and a predefined condition can be used to deem the output to be "unmodified" or "modified". Hence, the loss signal is not always an error signal.

When input data has traversed the neural network, the output data will reside in the nodes of the last network layer or the output layer. If the format of the output data is different from the reference data, a mapping can be performed between the output data and the reference data so that for each output data value there is a reference data value available.

In the field of image processing, the data values can be pixel properties, such as color setting or brightness. It may also be a specific property of a group of pixels within an image, such as a gaze angle of the eyes of an imaged face. The difference can then be expressed in a selected measure, for example as an L-norm, and can be referred to as an L-distance. Hence, while the property to be evaluated is physical and measurable, the actual loss signal related to it may be normalized and lacking a unit.

A loss signal can be a measure of a proximity to the target solution.

The training of a neural network can be performed by setting a limit on the loss signal so that when this limit is reached, the neural network is considered to have been trained/optimized and the training/optimization process is then halted.

Alternatively the training/optimization process can be halted when the loss signal converges or when a predetermined amount of steps have been taken.

Machine learning and training of neural networks is an optimization problem. There is no guarantee that a loss signal will reach its theoretical minimum at the end. When a machine learning practitioner adds a loss signal, he/she specifies a direction for improvement and its importance, without knowing how much the system will learn to improve.

Hence, a "gaze angle regression loss" or "gaze angle regression loss signal" can be the loss signal of a gaze angle (in an image) which is the outcome of the regression procedure. During this procedure or training phase, the labels of the real and synthetic data can be used to train the adversarial network to estimate images with gaze angles. For example, the adversarial network can return a small/large loss signal if it considers the image to have/not to have the desired gaze angle.

Labeled data or images can be used to train neural networks. For example, a photo of a cat can have the label "cat". Alternatively, a label of an input image can be another image, which provides a desired reference information. For example, the label of a labeled input image for a gaze angle can be an image of a person's face whose eyes have adopted the desired gaze angle alpha. It is preferred that such label is of the same format and type as the output of the neural network. For example, if the final output of the adversarial network is an estimated angle, the format of the label can be a string or number (the actual representation in the computer system) and the type can be e.g. the gaze angle.

An input labeled image or an input reference digital real image can comprise:
  an input image (e.g. a digital image in the format of pixels), a label of the image (which can be a digital image itself representing a feature of the image with a final outcome),
  the value of the feature in the label (floating point number),
  correction value of the feature (i.e. the difference between the value of the feature in the input image and the value of the feature in the label).

For example, if the data set comprises labeled images for gaze angles, a labeled sample can comprise:
  An input digital image showing gaze angle 3 degrees
  A label or target being a digital image showing a gaze angle of 10 degrees
  The value of the gaze angle 10 degrees (floating point number)
  The correction value of the gaze angle, i.e. 7 degrees (floating point number).

There can be different labels used for training the modifying network and the adversarial network.

"Heterogeneous data" can be a set of data having different data types and data formats. For example labeled- or unlabeled photos or labeled Computer Generated images (CGIs) are examples of different data types. Labeled- and unlabeled photos can be referred to as labeled- and unlabeled real images.

"Real data" is un-modified data, e.g. a photograph. The real data has been captured in the real world.

"Synthetic data" can be real data that has been digitally modified by a computer or completely generated by a computer. The purpose of synthetic data is to mimic real data.

"Modified data" is input data that has been altered by a neural network, for example images that have been warped by a neural network.

A "complementary data set" comprises data of different data types. For example, one data type can comprise images showing realistic (to a viewer) content. Another data type can be images showing specific continuous values, such as angles, lengths, volumes, colors, shapes, patterns, etc.

The advantage of using a complementary data set is that the loss signal for each data type can optimize for different (but required) properties of the output. If only one loss signal would be used, the outcome would not meet all requirements but could be weighted towards one type of data. For example, the desired output can be a change of an angle within an image. An undesired weighted outcome can then be that e.g. the angle has changed, but the image is no longer realistic (or vice versa).

"Target data" represents the desired outcome. For example it can be an image containing a correct representation of an object as a whole, or a desired value of a detail in the image. Target data is a reference data. Examples of target data can be e.g. photographs, man made- or computer generated drawings, which show physical objects, people or animals, text, diagrams, maps, etc.

Correction data are given to a modifying network as input for a modification.

An image can be "warped" so that the extension of a feature in the image can be e.g. prolonged, enlarged, shortened, decreased, or any change of shape both increasing or decreasing in size or modification of a contour. Additionally or alternatively, an image can be warped by re-sampling the colors of the image to new pixel positions that are located with an off-set (not necessarily adjacent or continuous) to their previous positions. For example, for a pixelized image this can mean that a feature extending over a first set of pixels can be warped into extending over a second set of pixels. The second set of pixels can be e.g. smaller, larger or differently shaped than the first set of pixels, and the second set of pixels can overlap or neighbour the first set of pixels in order to avoid discontinuities.

A "warp field" can be applied to any data collection, e.g. an image, to obtain a warped data collection. In case of a pixelized image, a warp field can store a coordinate offset, e.g. a colour coordinate offset, for every pixel, instead of their RGB color values. For example, the pixels with coordinate offset (0, 0) can be unwarped, i.e. retain its initial color settings. Other pixels can be replaced with the color settings of pixels next to them, possibly in a distance many pixel pitch (distance between two neigbouring pixels) steps away. The distance can be expressed in steps of complete pixel pitches, or in a fraction of them (i.e. a floating point number). In the latter case, the final location may be positioned between pixels. The pixel can then adopt an average of the color settings of two or more pixels closest to the final location. Applying a warp field can comprise copying and shifting pixels from the original image onto the warped image. A neural network can output warp fields instead of warped images. Applying a warp field is computationally inexpensive compared to computing the warp field with a neural network.

"Supervised training" of a neural network is implemented with labeled data only, hence there is always a "groundtruth" (a known reference value) available. "Unsupervised training" of a neural network is when the data has no label, hence no reference value is available.

"Gaze correction" can be described as the process of changing the appearant viewing direction of imaged eyes. Optionally, gaze correction can be obtained by using warping.

"Facial landmarks" or "key points" can be coordinates on an image of a face, indicating points of interest. These points can make it easier to compare images of faces and treat them uniformly, for example when performing warping of images. For example, the eyes of a person are always included in the set of points of interest. This allows subsequent processing blocks to easily use the position of the eyes as an input or calculate the best image crop of just the eyes. As a result, the processing block needs only to be designed to handle pixels of eyes, instead of any combination of pixel values.

Information on facial landmark extraction can be given by Bulat et. al (https://www.adrianbulat.com/downloads/FaceAlignment/FaceAlignment.pdf), Zadeh et. al (https://arxiv.org/pdf/1611.08657.pdf), Cao et. al (https://arxiv.org/pdf/1812.08008.pdf) or Faceplusplus (https://www.faceplusplus.com/landmarks/)

A "pixel value" can be any value related to a pixel in a digitally displayed image. For example a color or tristimulus value or a brightness value. Indirectly it can also be expressed as a driving current or a driving voltage of the physical unit displaying the pixel.

DETAILED DESCRIPTION

Past proposals to alleviate the problem of maintaining eye contact in an interactive video session comprise e.g. specialized hardware such as a camera array, depth cameras or infrared cameras. Embodiments of the present invention comprise a training method or system that is suitable for many conventional color cameras, or for any conventional color camera such as e.g. a web camera. Also a single channel camera (e.g. black/white or grey scale) can be used.

Ganin investigated the use of a GAN to obtain gaze correction where they only used labeled image pairs. But since they did not obtain any significant improvement, the method was discarded. The present inventor has found, however, that GANs can indeed be trained to obtain gaze correction if a heterogenous data set and multiple loss signals are used in the training.

The amount of available training data can put a limitation on the size or depth of a neural network, i.e. the amount of layers of the network. Since gathering of labeled data pairs is a relatively slow and costly procedure, the size of a data set that consists only of those kind of samples will be limited. On the other hand, a data set comprising unlabeled data can be large since they are abundantly available in many different types of data sets, for example unlabeled images on the internet. Similarly, large data sets of computer generated images can be made sufficiently diverse and are fast to produce.

On the other hand, deep neural networks having many layers and parameters can be prone to overfitting. Instead of learning the desired function, the network starts to remember all images in the training set and stores the desired outputs within those parameters.

The paper "Semi-supervised" ("*SEMI-SUPERVISED REGRESSION WITH GENERATIVE ADVERSARIAL NETWORKS FOR END TO END LEARNING IN AUTONOMOUS DRIVING*", anonymous publication for review, ICLR 2018) suggests the use of labeled and unlabeled input data. The patent application WO2018184187A1 uses real unlabeled data together with synthetic data.

Embodiments of the present invention use heterogeneous data sets comprising labeled- and unlabeled real data together with synthetic data (e.g. computer generated images) wherein each data set type alone, or two data sets of two data set types, would not be sufficient to train the system, even if it contained a large number of training examples. The labels and corresponding training signals of all data sets together are made different and complementary. This is one way of preventing that the training of the GAN converges into a solution that is overfitted or does not meet all the requirements (for example, if the network outputs realistic images but without any change in gaze angle). Hence, the above mentioned deficiencies can be avoided. A complementary data set can comprise a combination of a smaller and fully labeled data set, and unlabeled photos, and computer generated images (CGI). CGI's can have perfect groundtruth, i.e. exact information about the specific parameter sought. This type of data set enables the use of larger data sets and deeper architecture (i.e. more layers in the neural network) than what conventional solutions offer. The "Semi-supervised" paper does not point to the addition of a synthetic data set. WO2018184187A1 does not point to the addition of real labeled images. On the contrary WO2018184187A1 suggests to save time and cost by replacing real labeled data with synthetic data.

Hence, prior-art suggests to complement the real labeled data set with unlabeled data (to increase the size of the data set) or replace the real labeled data set with synthetic data (to get rid of the expensive real labeled data and to increase the data set). Prior-art does not increase the amount of data types in the input data set. The present invention, however, simultaneously can use at least real labeled data, synthetic labeled data and unlabeled data when training the neural network. This enables the network to consider all types of input data given and hereby balance the output.

An additional advantage of using a heterogeneous data set in embodiments of the present invention is that it can be implemented by using any picture or photo with a human face. Hence, a data set can be created using the large amount of photographs available for example on the internet.

Additionally, every modified image can be modified a second time with the reverse correction angle wherein the unmodified input data is used as target data. The modifying neural network can then be encouraged to limit the error between the second output signal and the original input signal. Using such forward- and reverse modification passes makes it possible to collect any photograph of eyes for unsupervised training.

The system can create a reverse modification of input data by applying a forward modification in the opposite direction. For example, if an input angle in the forward modification is x degrees, then the input angle would be −x degrees in the reverse modification. Such a correction value in the reverse direction can be referred to as the reverse correction value.

Embodiments of the present invention comprise a GAN where the adversarial network can estimate a loss signal of a continuous property of the data set, such as the gaze angle of an image of eyes. At the same time another loss signal can be used to stimulate that realistic images are obtained. A consolidated loss signal can comprise the weighted sum of loss signal from each pass in the process. The loss signal can be used to train the modifying (or generative) network of the GAN, e.g. by using SGD regression.

A neural network can be evaluated on a fixed number of inputs before the loss signals are calculated and regression gradients are derived and back propagated to modify the parameters of the network. The modifying (or generative) network and the adversarial (or discriminative) network can be trained alternately so that when one network is trained, the parameters of the other network are kept fixed. In a GAN configuration, the adversarial network can be used solely to train the modifying network. When the networks have been trained, only the trained modifying network is used in operation.

FIG. 1 shows a flow chart 10 of an embodiment of the present invention comprising different steps of the method for training the modifying network (while the parameters of the adversarial network are kept fixed). The steps 11 to 13 are performed by the modifying network and the output is given as input to the adversarial network which in the steps 14 to 15 classifies or estimates the data sets and calculates the gradients of the loss signals. Step 11 comprises reading the input data sets; step 12 comprises the data passing a first modification pass; step 13 comprises the data passing a reverse modification pass; step 14 comprises the data passing an adversary evaluation pass; step 15 comprises the loss signal aggregation and refinement. Hence, this step consolidates the gradients of the loss signals with respect to the neural network node weights from each step and creates a weighted sum which in step 16 is propagated back to the modifying network to adapt its parameters.

Each step of FIG. 1 will now be explained in more detail. In these exemplary embodiments, the loss signals are derived from gaze angle correction in images of faces. The present invention is however not limited hereto.

Figure 2:
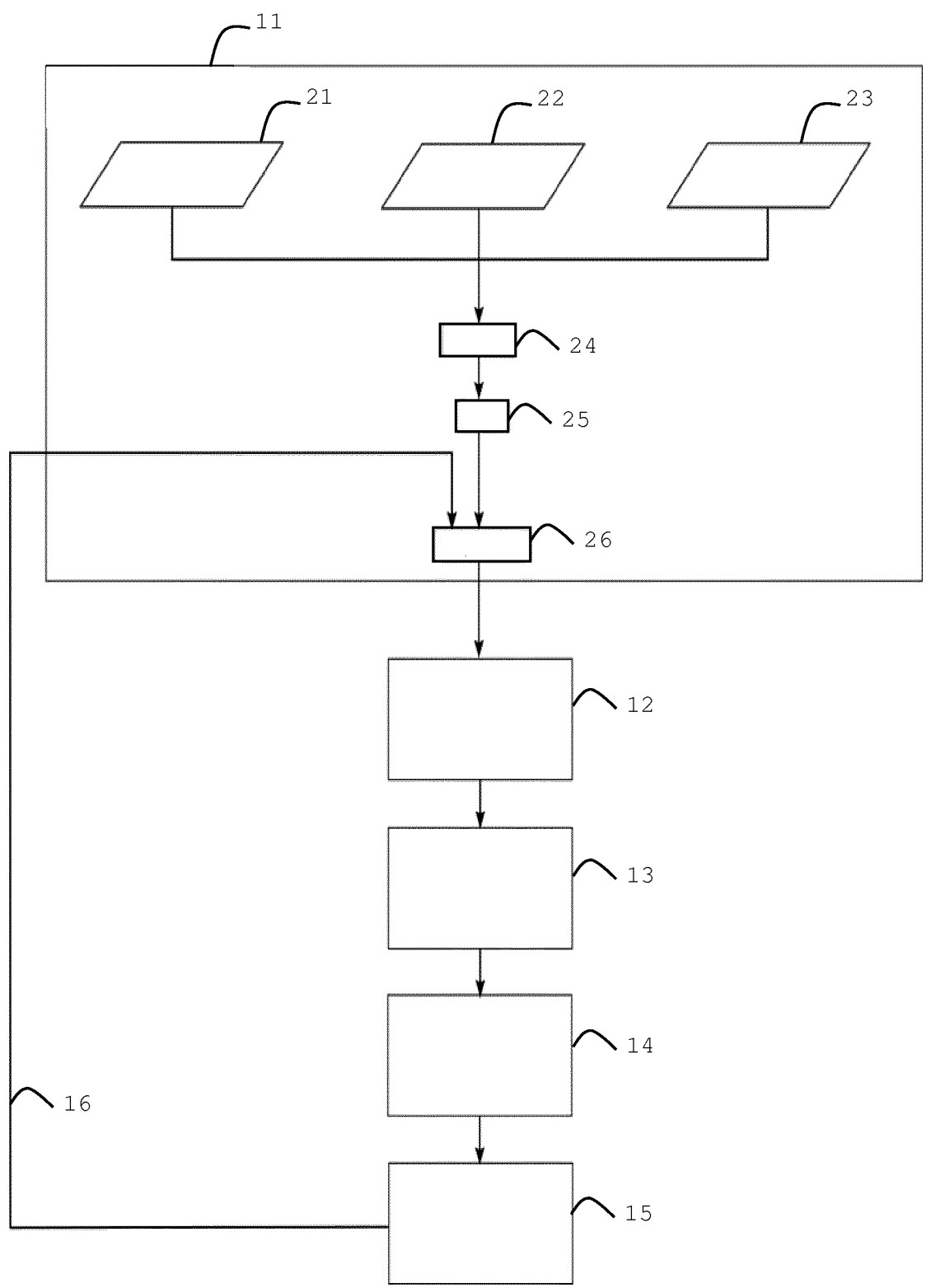

FIG. 2 shows details of step 11, reading data sets. The input can be a heterogeneous set of data comprising e.g. labeled photo pairs or data pairs 21, labeled CGI pairs 22, and unlabeled photos 23. Labeled photo pairs can be an example of input- and reference digital real images. Labeled CGI pairs can be an example of input- and reference digital synthetic images. Unlabeled photos can be an example of input digital real images. To add more variety to the order of inputs and the gradients, the system can interleave 24 and shuffle 25 all data before constructing an input batch 26 e.g. by sampling. In case of multiple types of data sets, each data set can have equal influence on the gradients, in which case they appear equally frequently in the batches, regardless of data set size. To achieve this, all data before shuffling can be interpreted as an interleaved union of the repeated data sets, in which samples from each data set follow each other alternately and can be reused when a data set runs out of samples.

Figure 3:
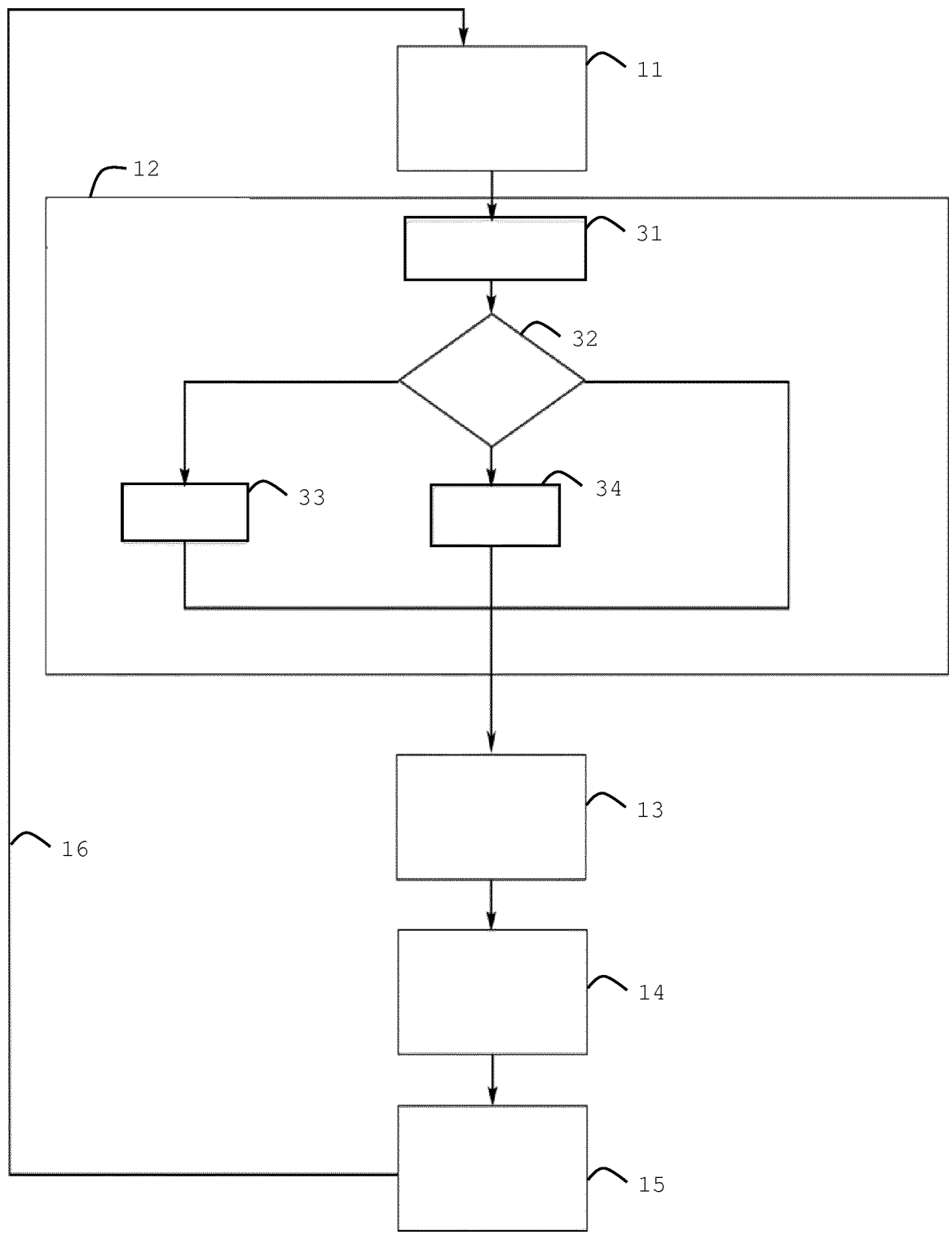

FIG. 3 shows details of the first modification pass 12, which is performed on the labeled data pairs which comprises input- and target images, and supervised loss signals are calculated. The first modification pass is also performed on the unlabeled data, but no supervised loss signal can be calculated for it. The modifying network receives the input data and a correction angle in step 31. The training or the running operation can be managed by a means for processing, which can provide the different types of data to the modifying network in step 32.

The modifying network warps the pixels of the input images with the correction angle. The correction angle can be part of the input sample or image. The loss signal can be expressed by an L-distance, for example L2 (mean squared error) can be calculated between pixel values of the warped image and the target image. This can be performed in step 33 for the labeled photograph pairs 21 and in step 34 for the labeled CGI pairs 22.

The intermediate loss signals can be stored in a memory.

Figure 4:
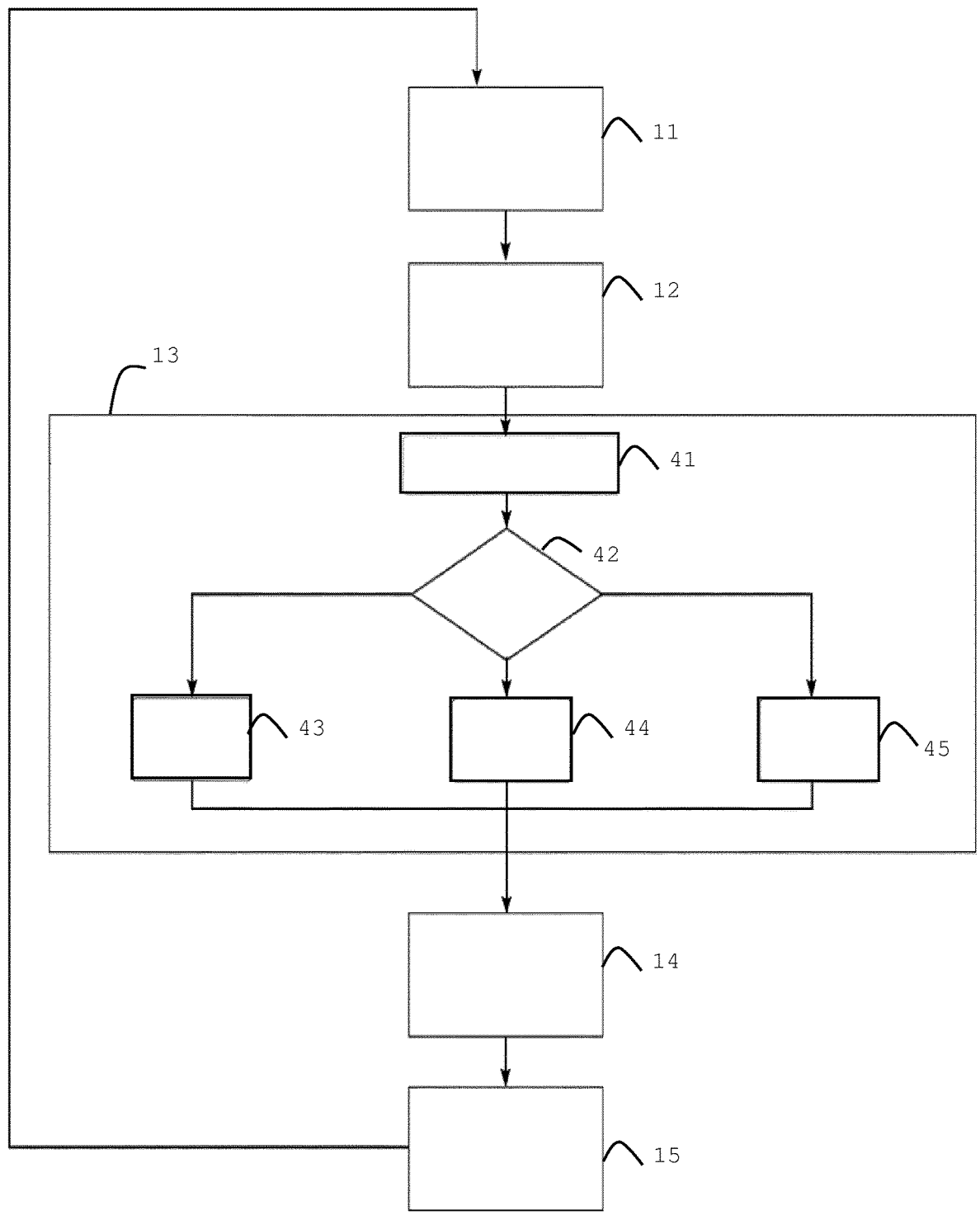

FIG. 4 shows details of the reverse modification pass 13. The input data is now the output data from the first modification pass of the labeled data and the unlabeled data. The target data is now the original labeled input data 21, 22, and the unlabeled input data 23. The correction angle is now the opposite of the above correction angle. Hence, the neural network uses the output data of the first modification pass, or warped output, to warp or modify pixels with the opposite correction angle 41. A means for processing managing the training can provide the different types of data to the modifying network in step 42. The L-distance loss is calculated 43, 44, 45 as in the first modification pass 12. The resulting loss signal can be referred to as the cycle loss signal of the training signal. The reverse modification pass can stimulate the neural network to model a reversible function from eye images to eye images. The output can therefore be more likely to resemble realistic eyes. The intermediate loss signals can be stored in a memory.

Figure 5:
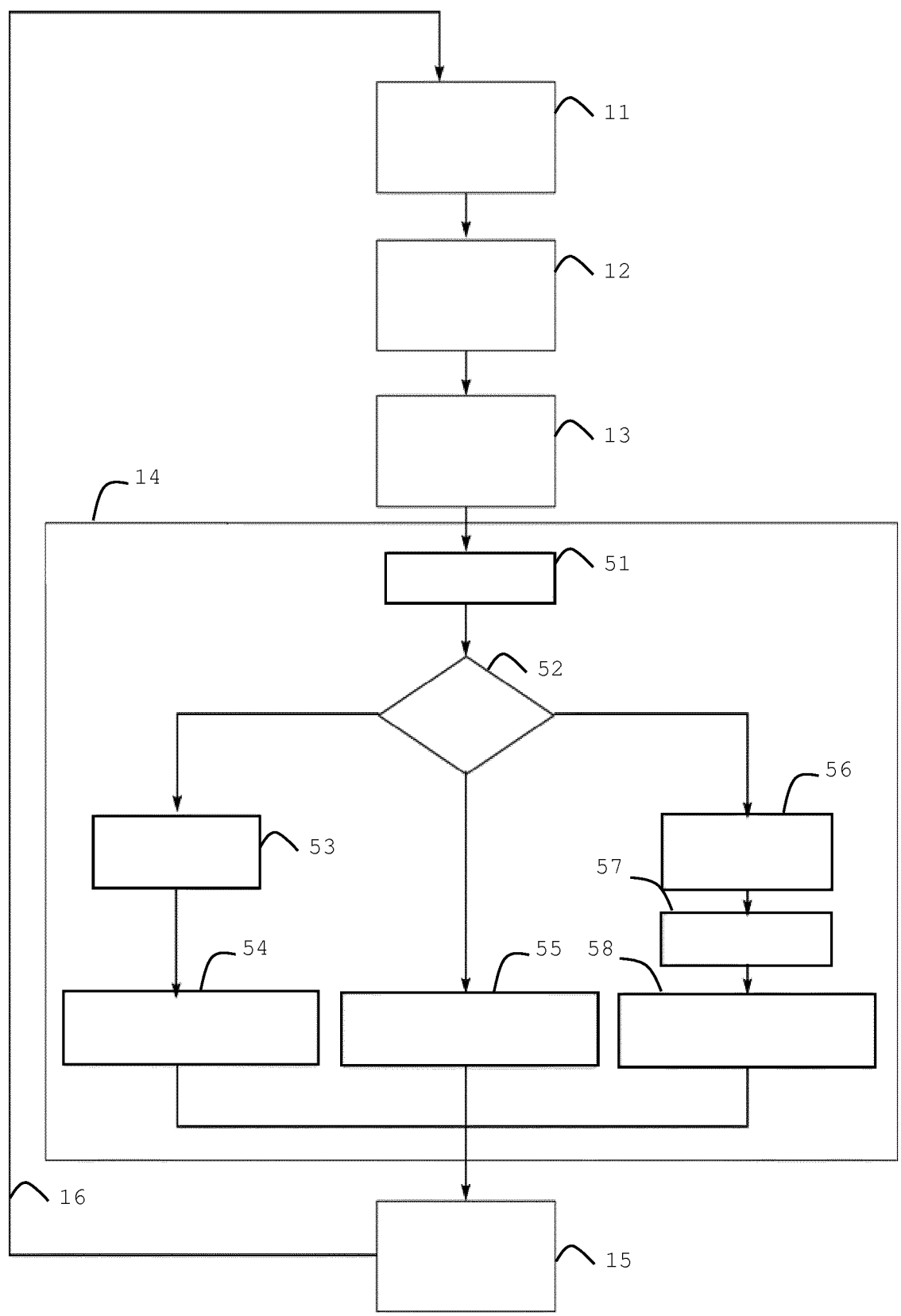

FIG. 5 shows details of the adversary evaluation pass 14. The adversarial network receives the output from the first modification pass 12. The modified images can be sent through the adversarial (or discriminating) network 51 for estimation, and depending on the type of the data set, a means for processing managing the training, can provide the different types of data to the adversarial network in step 52.

In step 53, the adversarial loss signal is calculated for the modified labeled photographs. The inputs to the adversarial network are here the outputted modified images or photographs and the target data. The adversarial loss signal can be obtained by investigating an output digital image with an adversarial trained neural network. If the image is deemed fake/real, a large/small loss signal value can be defined. The result can be used to decide whether the adversarial network estimates the images to be real or fake. The gaze angle regression loss signal is calculated in step 54 and the results can be used to decide whether the adversarial network estimates the gaze angle to be the target angle.

In step 55 the gaze angle regression loss signal is calculated for the modified labeled CGI's. The result can be used to decide whether the adversarial network estimates the gaze angle to be the target angle.

In step 56 the adversarial loss signal is calculated for the modified unlabeled photographs. Optionally, in step 57 the original or unmodified unlabeled photographs 23 can then be sent through the adversarial network to be estimated. Then the warped image can be sent to the adversarial network to be estimated. The loss signal 58 is then the difference between the estimated angle of the original unlabeled photographs plus the correction angle, and the estimated angle of the warped photographs. (This loss signal controls that an angle correction indeed has been implemented.)

The intermediate loss signals can be stored in a memory.

The calculated loss signals can give a numerical score on the realism of the photograph outputs. Scores for real images can be trained to be larger and as far as possible from scores for modified images to create the differentiation (while the numbers themselves are not used).

A goal of the present invention is to provide a heterogeneous training data to the neural network so that it is trained on all of the provided data types at each iteration. This is obtained by providing a combined loss signal that comprises loss signals from all different data types. Each loss signal depends on the value of one or more output nodes when input values of a certain data type have run through the network. For example, in the case of an angle correction, this can be one single node comprising a floating point number. Or in the case of an image modification, this can be a height number of nodes each containing a pixel value. Hence, using one or more loss signals is linked to using one more output nodes, and using all loss signals is related to using all output nodes. To obtain the desired balance in the training of a neural network, it is therefore desired to have a first loss signal that uses all output nodes and at least two other loss signals that each uses at least one node and together uses all of the output nodes of the first loss signal.

Figure 6:
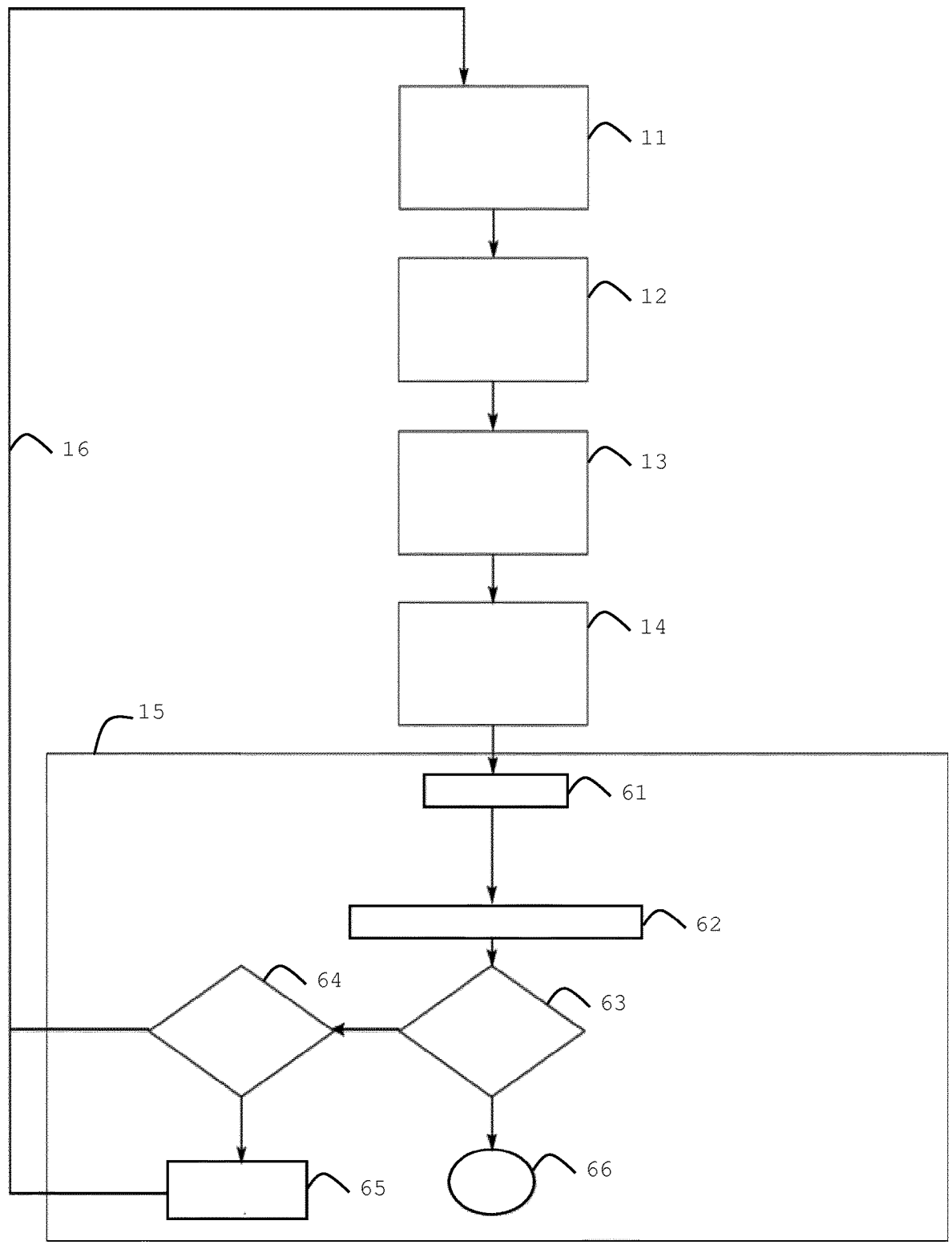

FIG. 6 shows details of the step 15 of loss signal aggregation and refinement.

In step 61, all previously calculated loss signals can be weighted and summed into a composed or combined loss signal. In step 62 the gradient is propagated back to the modifying network. In step 63 the means for processing managing the training, checks whether the combined loss signals have converged sufficiently (for example, the network could have trained on 3 000 000 or 30 000 000 images). If this is not the case, the means for processing managing the training can in step 64 check whether the modifying network (or modifier or generator) has been sufficiently trained (for example 50 000 images). If this is true, the system can in step 65 switch to train the adversarial network (or discriminator). In step 63 the system could conclude that all loss signals have converged so that the GAN is fully trained and end 66.

Figure 7:
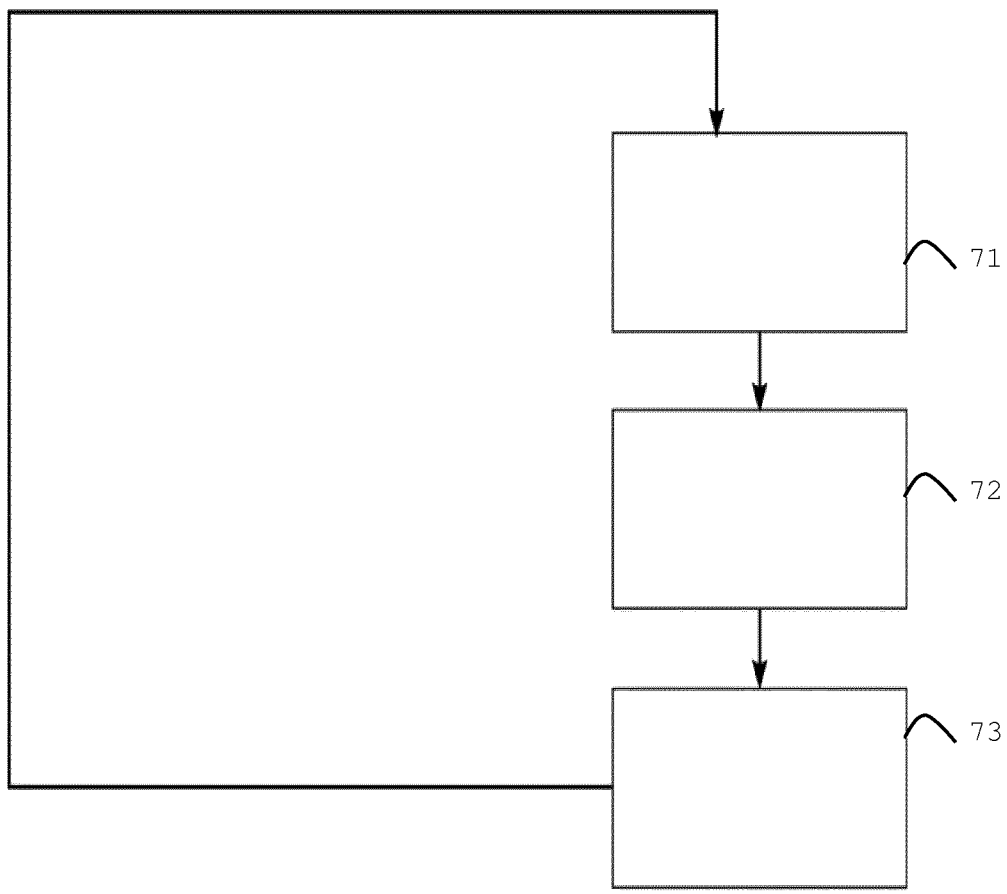
FIGS. 7 to 8 show flow charts of an embodiment of the present invention comprising steps of training an adversarial neural network.

FIG. 7 shows a flow chart 70 of an embodiment of the present invention comprising different steps of the method for training the adversarial network (while the parameters of the modifying network are kept fixed). The procedure is analogue to that of training the modifying network, so that step 71, 72 and 73 corresponds, mutatis mutandis, to steps 11, 14 and 15 of flow chart 10 in FIG. 1. The input for the adversarial network is the modified data and the target data (e.g. the image labels), or unmodified unlabeled photographs.

Figure 8:
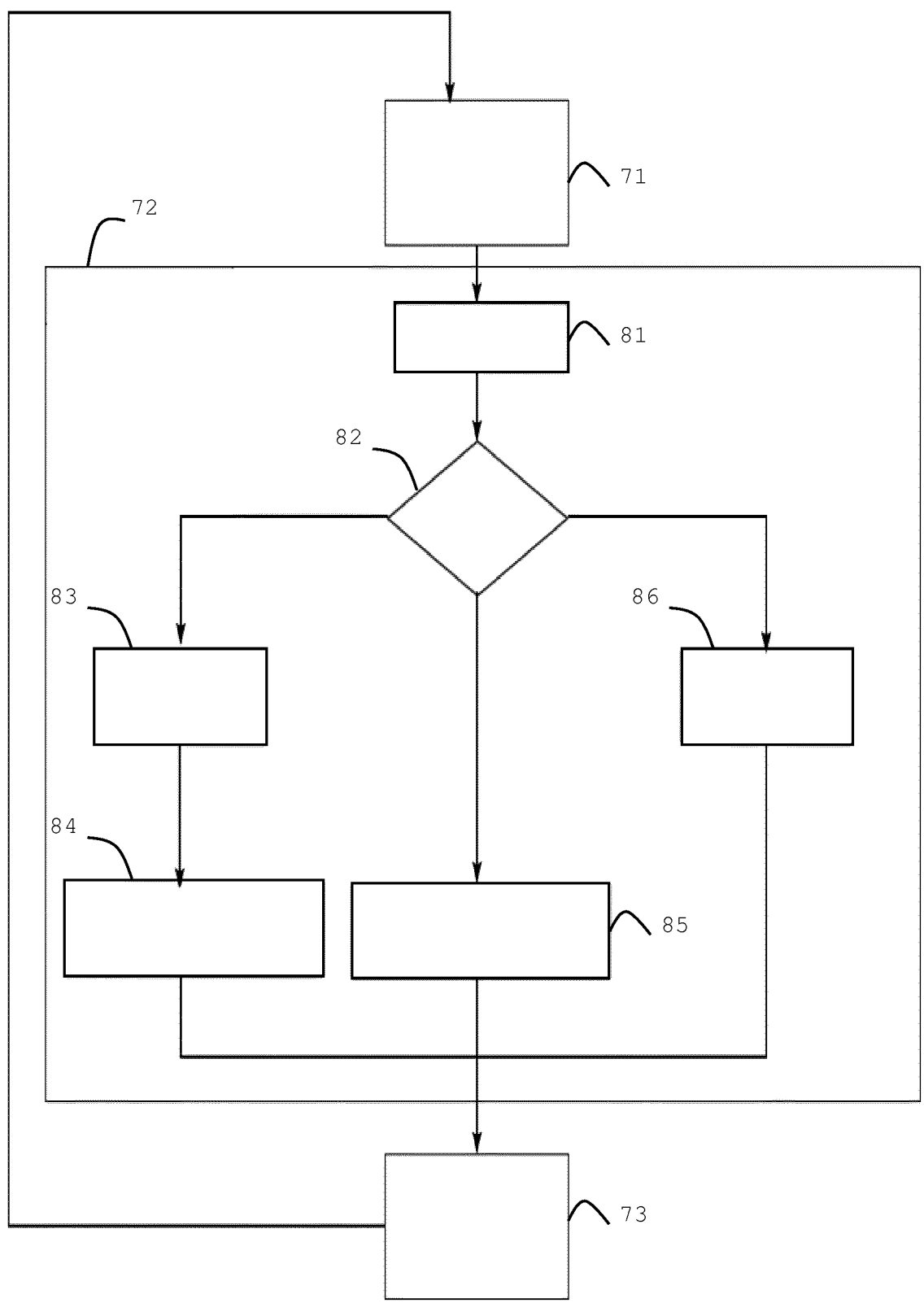

FIG. 8 shows details of the image evaluation pass 72. In step 81 all input images are sent through the modifying network and in step 82 the output is differentiated by the means for processing managing the training, depending on their original type. Step 83, 84 and 85 corresponds, mutatis mutandis, to steps 53, 54 and 55 of FIG. 5. For the unlabeled photographs, only the adversarial loss signal is calculated in step 86. This loss signal gives a measure of whether the image is real or fake. For example, the average value of loss signals for fake and real images, respectively, of a fully trained adversarial network should be easily distinguishable (while the values themselves can be irrelevant).

The input for the adversarial network is the modified data and the target data (e.g. the image labels). Step 73 of loss signal aggregation and refinements corresponds, mutatis mutandis, to steps 61, 62, 63 and 66 in FIG. 6.

Figure 9:
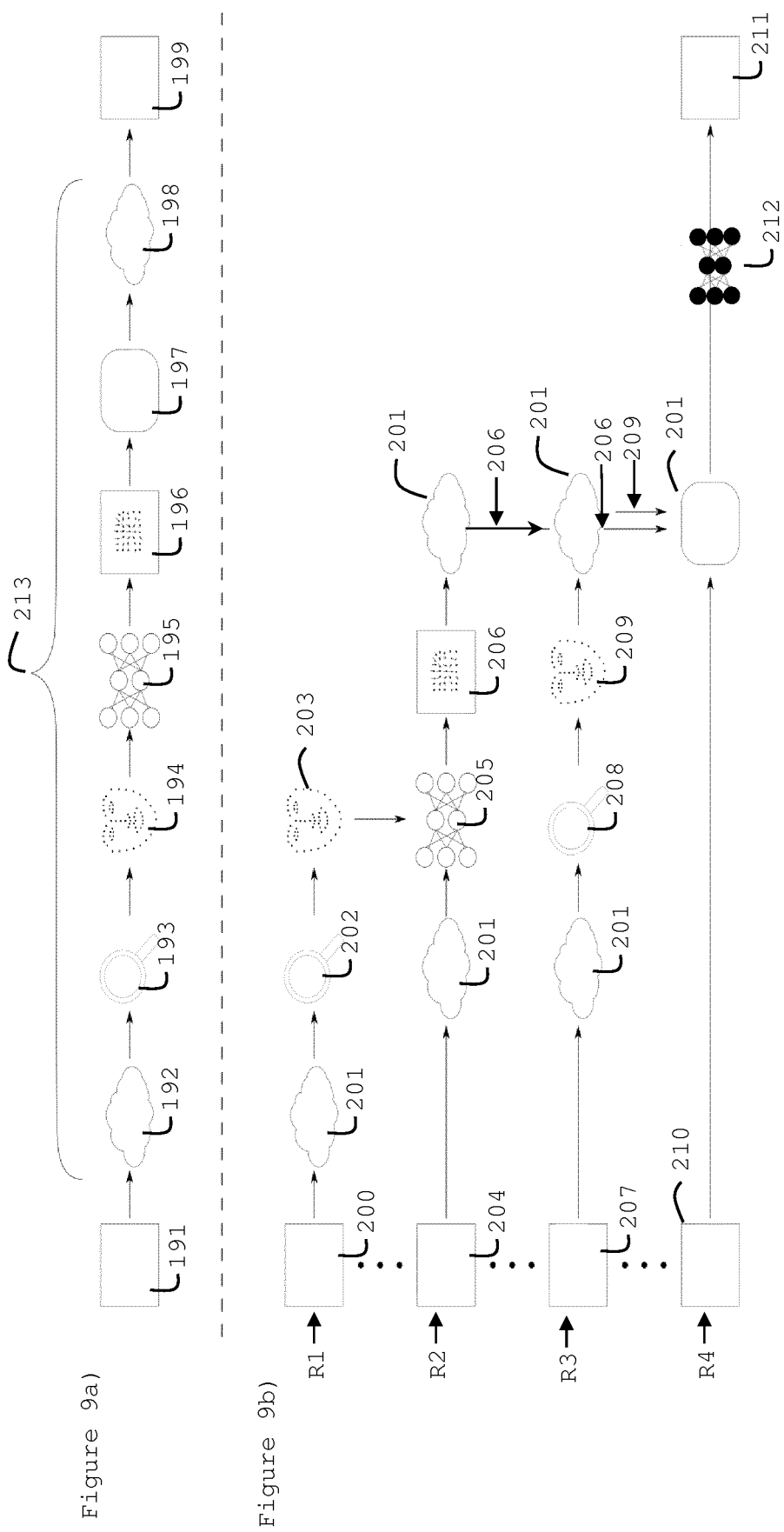
FIGS. 9a) and b) show embodiments of the present invention comprising the operation of a trained modifying neural network.

FIGS. 9a) and b) illustrate another embodiment of the present invention where the modifying network has already been trained (e.g. by the above method) and is used in operation. The embodiment comprises using intermediate results in order to decrease processing delay.

FIG. 9a) shows the unoptimized processing delay or sequential process 213 where a camera frame image number x 191 is sent from a local means for processing (not shown) to a cloud server (or other means for processing) 192 and facial landmark coordinates are detected 193 and added 194 to the frame image. The parameter x is an integer representing the frame's position in a sequence of frames, so that e.g. frame image number x+1 is displayed before frame image number x+2. The parameters x, m, n and q are integers.

The frame image with the facial landmarks is sent to the (trained) modifying neural network 195, which calculates a warp field 196 and applies it 197 on the eye region of the frame image. The cloud server (or other means for processing) 192 hosts the neural network. The warped frame image is then sent back from the cloud/means for processing 198 to the local means for processing (not shown), which outputs the final frame image 199.

FIG. 9b) shows how four frames in processing row R1-R4 can be processed somewhat in parallel so that later processing rows can use results of previous processing rows. This multi-step process with intermediate results enables a trade off between processing delay and warping errors. The individual processing steps are the same as those described in FIG. 9a).

Processing row R1 starts by sending the camera frame image 200 from a local means for processing (not shown) to the cloud/means for processing 201. The facial landmark detection 202 is performed and the facial landmark coordinates 203 are defined.

Processing row R2 is meanwhile started on frame image 204, which is the frame image number x+n where n>=1. The frame image 204 is sent from the local means for processing (not shown) to the cloud/means for processing 201. Instead of defining the facial landmark coordinates of frame image 204, the system uses the facial landmark coordinates of frame image 200. Hence, the modifying neural network 205 receives the frame image 204 and the facial landmark coordinates 203 (of frame image 200), and calculates a warp field 206 which is sent back from the cloud/means for processing 201 to the local means for processing (not shown). The cloud server (or other means for processing) hosts the neural network.

Processing row R3 is meanwhile started by sending frame image 207 (having number x+m, m>=n+1) to the cloud/means for processing 201. The facial landmark detection 208 is performed and the facial landmark coordinates 214 of frame image 207 are sent from the cloud/means for processing 201 to the local means for processing (not shown).

Processing row R4 is meanwhile started on the local means for processing (not shown) with frame image 210 (having number x+q, q>=m+1). Since the system has already received warp field 206 (based on frame image 204 and frame image 200) and facial landmarks 209 (based on frame image 207), these can be used in step 201 to warp frame image 210 into frame image 211. Step 201 can be performed in the local means for processing so that undesired cloud processing can be avoided.

The decrease of processing delay can be obtained by comparing R4 with the full processing sequence in FIG. 9a).

A setting can determine how far apart the frames can be that are used for calculation and display of the landmark coordinates and warping. This setting can be modified at any time. The inventor has found that the described procedure yields sufficient accuracy with the advantage of reduced processing time.

In another embodiment of the present invention, the adversarial network can also be used in running operation. For example, the adversarial network can be used for a final check of the warped result before showing it to the user, e.g. to make sure that the output data is still acceptable. For example, it can represent the system checking if a warped image for gaze correction still resembles an eye. This optional step 212 in FIG. 9b) can then be placed just before the final frame image 211. Since older facial landmarks are used, a discrepancy could arise, for example if the user moves too much or it was a difficult image or correction angle to work with. Because this can increase the processing delay, though still only to a fraction of the unoptimized delay, it may be preferred to only perform this check on a selection of frames. Alternatively, the check may be performed when the facial landmarks or warp field have exceeded a certain age threshold.

Additionally or alternatively, the adversarial network can be used to calibrate the size of the users image and its position within the display frame. In order to make a relevant correction, the system needs to know the distance between the camera and the eyes of the conversational partner on the display. The distance from the user to the camera can be estimated by looking at the size of the head in the camera frames and considering a typical head sizes. The user can be asked to look at reference points on the display and related gaze angles can be estimated. With this input a good estimate of the display size can be done for a specific display. With the above data it is possible to create one or more virtual cameras which are positioned so that they overlap the persons currently displayed.

Additionally or alternatively the adversarial network can be used to limit the number of simultaneous gaze corrections that has to be calculated. For example in a lecture room with 60 students it can be expensive to run gaze correction simultaneously for all people in the room. This can be limited by only running it for people that are actually attempting to make eye contact. Head pose can be sufficient to determine what display a teacher is currently looking at.

Here follows an exemplary embodiment of how a neural network of the present invention can be trained.

Both the adversarial- and the modifying network can be initialized with random weights. 5008 samples can be randomly taken from the datasets and sent through the untrained modifying network. This can be a first data set to train the adversarial network. The adversarial network can process batches of 16 images at a time. After each batch, the gradients can be calculated and applied to modify the weights. After 500 batches, the training of the adversarial network can be stopped and the modifying network can start to train on batches of 16 samples. The input and output images are sent through the adversarial network with frozen weights. The realism score and estimated angles can be used in the loss signals. After e.g. every 100 batches, 40 batches can be sampled from the validation data sets. If the loss signal value on those batches is lower than any previous loss signal value, the weights can be saved as a "checkpoint" hereafter referred to as a minimum validation loss checkpoint. After 750 batches, the training of the modifying network can be stopped. A new set of 5008 samples can be collected and modified by the modifying network. Both the old and the new set of modified samples are shuffled together and used to train the adversarial network for e.g. 500 batches.

The above cycle can be iterated during e.g. two weeks (depending on hardware). In one iteration session, the first validation loss signal value was 5.24 and the last validation loss signal value was 3.89. The lowest validation loss signal value was 2.40 (this could be due to that the adversarial network improved or due to overfitting). Every so often during training, a user can check the output of the modifying network on training and validation input, for several angles. Both the minimum validation loss checkpoint and the last checkpoint are evaluated. Depending on the image quality perceived by the observer, the training might be stopped.

Figure 10:
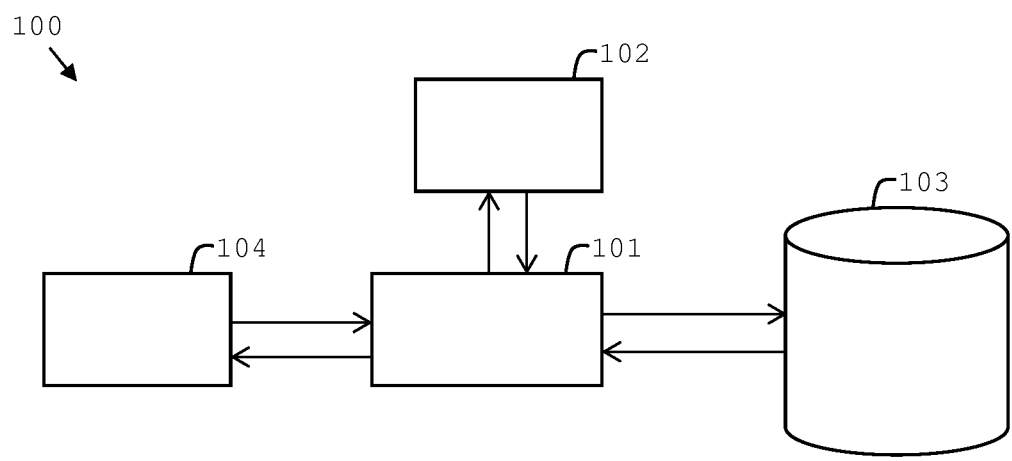
FIG. 10 shows a block diagram of an embodiment of the present invention comprising a computerized system.

FIG. 10 shows another embodiment of the present invention comprising a system of the present invention. The system 100 comprises a CPU 101 that can host the computation nodes of one or more neural networks. The CPU 101 can be local, e.g. close to a user operating/using the system. A memory 102, a display 104, and means for an additional processor 103, can be connected to the local CPU via a digital network. The additional processor or CPU 103 can be local or remote (e.g. on a cloud server) or a combination thereof. The display 104 can have pixels so that it can display pixelized representations of images. Each pixel can have various parameters such as color point value and brightness, which can be represented by a digital driving level (DDL), often an electrical current. The DDL can be controlled by the CPU 101.

The additional processor 103 can be eg. a remote CPU. The CPU 101 can host the nodes of the neural networks. The memory 102 can store the nodes and their interconnections, which can be uploaded to the RAM of the CPU 101 and passed on to the remote CPU 103, if needed. The training or the running operation is managed by the CPU 101. Alternatively, the neural networks can be stored in the local CPU 101. The processors 101 or 103 can comprise GPU's.

In another embodiment of the present invention there is provided an apparatus and method for performing predictive analytics (for example implementing and using classification or regression methods) onto output data of the previously described embodiments, in order to improve their performance (e.g. convergence speed or convergence values, or improved output quality such as image quality). The predictive analytics can be expressed in processor-executable instructions which can be implemented on the system in FIG. 10 (or on a second system comprising the system in FIG. 10). Unsupervised training can be performed by letting implementations of the previously described embodiments run during a training period and use the accumulated output data as reference values when executing the classification or regression instructions. Additionally or alternatively, supervised training can be performed by providing the system with known reference values.

Methods according to the present invention can be performed by a a processor or a processing means either as a standalone device or embedded in a subsystem or other device. The present invention can use a processing engine being adapted to carry out functions. The processing engine preferably has processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing means or processor may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, e.g. as itemised below when the software is loaded onto the controller and executed on one or more processing engines such as microprocessors, ASIC's, FPGA's etc. Hence, a processing means or processor for use with any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:

Training generative adversarial networks with heterogeneous data as well as a computer program product for carrying out the method.

Maintaining the impression of eye-contact in video conferencing.

Warping pixels in images.

The software embodied in the computer program product is adapted to carry out the following functions when the software is loaded onto the respective device or devices and executed on one or more processing engines such as microprocessors, ASIC's, FPGA's etc.:

Training a neural network by adapting weight values of nodes of the neural network, the neural network having output nodes.

Storing digital images of a first data type being pairs of input- and target digital real images, a second data type being pairs of input- and target digital synthetic images, and a third data type being input unlabeled digital real images,
whereby each image is represented by pixels, the pixels having pixel properties.

Processing the digital images of the first data type, the second data type and the third data type;
the processing comprising a step of creating one or more loss signals by, for example:
modifying each input image of the first, second and third data types to form modified digital images of the first, second and third data types,
obtaining output values in the output nodes by processing pixels of the modified digital images through the neural network,
obtaining loss signals
for the first data type by using all output nodes,
for the second data type by using at least one of the output nodes, and
for the third data type by using at least one of the output nodes, so that the second and third data types are together using all of the output nodes.

The software embodied in the computer program product is adapted to carry out the following functions when the software is loaded onto the respective device or devices and executed on one or more processing engines such as microprocessors, ASIC's, FPGA's etc.:
combining the loss signals from digital images of each of the first, second and third data types into a combined loss signal:
the processing comprising a step of updating the weight values of the neural network by back propagating the combined loss signal through the neural network; and storing the updated weight values.

Creating one or more loss signals can additionally comprise:
for each modified digital image of the first and second data types, residing in the output nodes,
creating a loss signal using all output nodes, and the pixel values of the target digital image.

Creating one or more loss signals can additionally comprise:
for each modified digital image,
processing the modified digital image through the network using reverse modification to obtain in the output nodes a reversely modified digital image;
for each data type, creating a loss signal using the output nodes, and the pixel values of unmodified digital image.

Creating the one or more loss signals can additionally comprise:
for each modified- and reference digital image of the first and third data types, The software embodied in the computer program product is adapted to carry out the following functions when the software is loaded onto the respective device or devices and executed on one or more processing engines such as microprocessors, ASIC's, FPGA's etc.:
for each output digital image, having a trained adversarial network, estimating each modified- and reference digital image
by assigning a first and second numerical output value in the output nodes, respectively,
creating the loss signal as the difference between the first output value and the second output value.

For each unmodified- and modified digital image of the third data type, a trained adversarial network estimates each unmodified- and modified digital image,
assigns a first and second numerical output value in the output nodes, respectively, and creates the loss signal as the difference between
the first numerical output value plus an input correction value, and the second output value.

Pre-processing, interleaving or shuffling of all input data sets before constructing an input data batch by sampling.

Creating a mapping between the values in the output nodes and the target digital image.

The software embodied in the computer program product is adapted to carry out the following functions when the software is loaded onto the respective device or devices and executed on one or more processing engines such as microprocessors, ASIC's, FPGA's etc.:
warping digital images for use with a system having means for processing and a non-volatile memory, the system being adapted to define facial landmarks of digital images.
Receiving digital images;
the means for processing receiving a frame image number x
detecting the image pixel coordinates of the facial landmarks on the image and sending the image pixel coordinates to a neural network,
the neural network being adapted to generate a warp field;
applying the warp field onto the frame image number x;
outputting the warped frame image number x on the display;
and for at least one frame image number x+n, n>=1;
using the warp field obtained from frame image number x;
and for at least one frame image number x+m, m>=n+1,
using the facial landmarks obtained from frame image number x+n.

Reading input data sets, wherein the input data sets are a heterogeneous set of data, whereby The heterogeneous set of data can comprise any some or all of labeled photo pairs, labeled CGI pairs, and unlabeled photos.

Interleaving or shuffling all input data sets before constructing an input data batch by sampling.

When multiple types of data sets are present, each data set has equal influence on gradients, in which case they appear equally frequently in the batches, regardless of data set size.

Appearing equally is provided by all input data sets before shuffling are interpreted as an interleaved union of the repeated data sets, in which samples from each data set follow each other alternately and can be reused when a data set runs out of samples.

Performing a first modification pass, on the labeled data pairs which comprise input- and target images.

Calculating supervised loss signals.

Performing the first modification pass on the unlabeled data, but no supervised loss signal needs to be calculated for it.

The software embodied in the computer program product is adapted to carry out the following functions when the software is loaded onto the respective device or devices and executed on one or more processing engines such as microprocessors, ASIC's, FPGA's etc.:

Adapting a modifying network to receive the input data and a correction angle.

Providing by a processor or a means for processing with the different types of data to the modifying network.

Adapting the modifying network to warp pixels of the input images with a correction angle.

Expressing the loss signal by an L-distance calculated between pixel values of the warped image and the target image.

Storing an intermediate loss signal in a memory.

Performing a reverse modification pass wherein the input data sets can be provided by output data from the first modification pass of the labeled data and the unlabeled data.

Target data can be the original labeled input data, and unlabeled input data.

A correction angle can be the reverse correction angle.

Calculating an L-distance loss signal in the reverse modification pass as in the first modification pass.

The resulting loss signal can be the cycle loss signal of the training signal.

The reverse modification pass can stimulate the neural network to model a reversible function from eye images to eye images.

The intermediate loss signal can be stored in a memory.

The software embodied in the computer program product is adapted to carry out the following functions when the software is loaded onto the respective device or devices and executed on one or more processing engines such as microprocessors, ASIC's, FPGA's etc.:

adversary evaluation pass can comprise an adversarial network receiving the output from the first modification pass.

Sending the modified images through the adversarial or discriminating network for estimation, and depending on the data type, different loss signals can be calculated.

An adversarial loss signal can be calculated for modified labeled photographs.

Based on the result a decision can be made whether the adversarial network estimates the images to be real or fake.

The software embodied in the computer program product is adapted to carry out the following functions when the software is loaded onto the respective device or devices and executed on one or more processing engines such as microprocessors, ASIC's, FPGA's etc.:

Calculating a gaze angle regression loss signal.

Using the gaze angle regression loss signal to decide whether the adversarial network estimates the gaze angle to be the target angle.

Calculating the gaze angle regression loss signal for the modified labeled CGI's.

Using the gaze angle regression loss signal to decide whether the adversarial network estimates the gaze angle in the modified image to be the target angle.

Calculating an adversarial loss signal for the unlabeled photographs whereby the result can be used to decide whether the adversarial network estimates the images to be real or fake.

The software embodied in the computer program product is adapted to carry out the following functions when the software is loaded onto the respective device or devices and executed on one or more processing engines such as microprocessors, ASIC's, FPGA's etc.:

Sending original unlabeled photographs through the adversarial network to be estimated.

Sending a warped image to the adversarial network to be estimated.

Calculating the loss signal as the difference between the estimated angle of the original unlabeled photographs plus the correction angle, and the estimated angle of the warped photographs.

Giving the calculated loss signals a numerical score, or an alphanumeric score, on the realism of the photograph outputs.

Training the scores for real images need to be larger or of a higher value than scores for modified images to create a differentiation between the different image types.

The software embodied in the computer program product is adapted to carry out the following functions when the software is loaded onto the respective device or devices and executed on one or more processing engines such as microprocessors, ASIC's, FPGA's etc.:

Loss signal aggregation and refinement comprising:
all previously calculated loss signals are weighted and summed into a composed or combined loss signal.

Propagating a gradient of the loss signal back to the modifying network.

Fully training a generative adversarial network when all included loss signals have converged.

Training of an adversarial network while the parameters of the modifying network are kept fixed.

An image evaluation pass can comprise: all input images are sent through the modifying network and the output is differentiated depending on their original type.

For the unlabeled photographs, only the adversarial loss signal needs to be calculated, this loss signal giving a measure of whether the image is real or fake.

The software embodied in the computer program product is adapted to carry out the following functions when the software is loaded onto the respective device or devices and executed on one or more processing engines such as microprocessors, ASIC's, FPGA's etc.:

Using a modifying network that has been trained in operation.

Using intermediate results in order to decrease processing delay.

The software embodied in the computer program product is adapted to carry out the following functions when the software is loaded onto the respective device or devices and executed on one or more processing engines such as microprocessors, ASIC's, FPGA's etc.:

Performing an unoptimized sequential process wherein a camera frame image number x is sent from a local means for processing to a cloud server or other means for processing and facial landmark coordinates are detected and added to the image.

Sending the frame image with the facial landmarks to the trained modifying neural network, which calculates a warp field and can apply it on the eye region of the frame image.

Hosting the neural network on a cloud server or other means for processing.

Sending a warped image back from a cloud server or means for processing to the local means for processing, which can then output a final image frame.

The software embodied in the computer program product is adapted to carry out the following functions when the software is loaded onto the respective device or devices and executed on one or more processing engines such as microprocessors, ASIC's, FPGA's etc.:

Processing a number of frames in processing rows such as four frames in four processing rows, in parallel so that later processing rows can use results of a previous processing row or rows.

Processing of the first row can start with the sending of a first camera frame image from a local means for processing to the cloud server or means for processing.

Performing facial landmark detection and defining facial landmark coordinates.

Processing the next row such as the second row can in the meantime be started on a second frame image, which is the image of frame number x+n where n>=1.

Sending the second frame image from the local means for processing to the cloud server or means for processing.

Using the facial landmark coordinates of a first frame image instead of defining the facial landmark coordinates of the second frame image.

The software embodied in the computer program product is adapted to carry out the following functions when the software is loaded onto the respective device or devices and executed on one or more processing engines such as microprocessors, ASIC's, FPGA's etc.:

The modifying neural network receiving the second frame image and the facial landmark coordinates of the first frame image, and calculating a warp field which is sent back from the cloud server or means for processing to the local means for processing.

Processing the next row such as the third row by sending third frame image number x+m, m>=n+1, to the cloud server or means for processing.

Performing facial landmark detection sending the facial landmark coordinates of the third frame image from the cloud server or the means for processing to the local means for processing.

Processing of the next row such as the fourth row on the local means for processing with the fourth frame image number x+q, q>=m+1.

Receiving the warp field based on the second frame image and the first frame image and facial landmarks based on the third frame image.

Warping the next frame image such as warping the fourth frame image into a fifth frame image.

Making a setting which determines how far apart the frames can be that are used for calculation and display of the landmark coordinates and warping.

The software embodied in the computer program product is adapted to carry out the following functions when the software is loaded onto the respective device or devices and executed on one or more processing engines such as microprocessors, ASIC's, FPGA's etc.:

Receiving labeled and unlabeled data that have been modified by a modifying network.

Fixing parameters of the modifying network, while an adversarial network is trained to estimate each data.

Estimating each data by calculating a score for the data without needing to know whether it is real or modified.

Calculating a higher score or a score with a higher value for real data and a lower score or lower value for modified data.

The software embodied in the computer program product is adapted to carry out the following functions when the software is loaded onto the respective device or devices and executed on one or more processing engines such as microprocessors, ASIC's, FPGA's etc.:

When training the modifying network, the adversarial network can already be trained to give high scores or higher values for unmodified data, and low scores for modified data.

Fixing the parameters of the adversarial network, whereby the modifying network can then modify data and send it to the adversarial network.

Scoring the data, whereby parameters of the modifying neural network are be adapted (in several iterations) until the score reaches a desired value.

Scoring for all real- and modified data respectively are aggregated whereby aggregating can include calculating the mean for the respective data type set.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid-state memory such as a USB flash memory, a ROM, etc.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments. It is therefore intended that the following appended claims and claims hereafter introduced are interpreted to include all such modifications, permutations, additions, omissions, and subcombinations as may reasonably be inferred. The scope of the claims should not be limited by the preferred embodiments set forth in the examples, but should be given the broadest interpretation consistent with the description as a whole.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A method for training a neural network by adapting weight values of nodes of the neural network, the neural network having output nodes;
the method comprising storing digital images of a first data type being pairs of input- and target digital real images, a second data type being pairs of input- and target digital synthetic images, and a third data type being input unlabelled digital real images,
wherein each image is represented by pixels, the pixels having pixel properties;
the method comprising processing the digital images of the first data type, the second data type and the third data type;
the processing comprising a step of creating one or more loss signals by:
modifying each input image of the first, second and third data types to form modified digital images of the first, second and third data types,
obtaining output values in the output nodes by processing pixels of the modified digital images through the neural network,
obtaining loss signals
for the first data type by using all output nodes,
for the second data type by using at least one of the output nodes, and
for the third data type by using at least one of the output nodes, so that the second and third data types are together using all of the output nodes;
the processing comprising a step of combining the loss signals from digital images of each of the first, second and third data types into a combined loss signal;
the processing comprising a step of updating the weight values of the neural network by back propagating the combined loss signal through the neural network; and
the processing comprising a step of storing the updated weight values.

2. The method according to claim 1, wherein the step of creating one or more loss signals additionally comprises:
for each modified digital image of the first and second data types, residing in the output nodes,
creating a loss signal using all output nodes, and the pixel values of the target digital image.

3. The method according to claim 1, wherein the step of creating one or more loss signals additionally comprises:
for each modified digital image,
processing the modified digital image through the network using reverse modification to obtain in the output nodes a reversely modified digital image;
for each data type, creating a loss signal using the output nodes, and the pixel values of unmodified digital image.

4. The method according to claim 1, wherein the step of creating the one or more loss signals additionally comprises:
for each modified- and reference digital image of the first and third data types,
for each output digital image, having a trained adversarial network, estimating each modified- and reference digital image by assigning a first and second numerical output value in the output nodes, respectively,
and creating the loss signal as the difference between the first output value and the second output value.

5. The method according to claim 1, further comprising:
for each unmodified- and modified digital image of the third data type,
having a trained adversarial network estimating each unmodified- and modified digital image,
assigning a first and second numerical output value in the output nodes, respectively,
and creating the loss signal as the difference between the first numerical output value plus an input correction value, and the second output value.

6. The method according to claim 1, comprising creating a mapping between the values in the output nodes and the target digital image.

7. The method according to claim 1, wherein a modifying network has been trained and is used in operation, and further comprising using intermediate results in order to decrease processing delay.

8. A method for warping digital images for use with a system having means for processing and a non-volatile memory, the system being adapted to define facial landmarks of digital images; the method comprising the steps of:
receiving digital images;
the means for processing receiving a frame image number x
detecting the image pixel coordinates of the facial landmarks on the image and sending the image pixel coordinates to a neural network;
the neural network adapted to generate a warp field;
applying the warp field onto the frame image number x;
outputting the warped frame image number x on the display;
and for at least one frame image number x+n, n>=1;
using the warp field obtained from frame image number x;
and for at least one frame image number x+m, m>=n+1, using the facial landmarks obtained from frame image number x+n.

9. The method according to claim 8, wherein four frames in four processing rows are processed in parallel so that later processing rows can use results of previous processing rows.

10. The method according to claim 9, wherein facial landmark detection is performed and facial landmark coordinates are defined.

11. The method according to claim 10, wherein the modifying neural network receives the second frame image and the facial landmark coordinates of the first frame image, and calculates a warp field which is sent back from the cloud server or means for processing to the local means for processing.

12. The method according to claim 11, wherein processing the third row is meanwhile started by sending third frame image number x+m, m>=n+1, to the cloud server or means for processing.

13. The method according to claim 10, wherein the facial landmark detection is performed and the facial landmark coordinates of the third frame image are sent from the cloud server or the means for processing to the local means for processing.

14. The method according to claim 10, wherein the warp field has already been received based on the second frame image and the first frame image and facial landmarks based on the third frame image, whereby these can be used to warp the fourth frame image into a fifth frame image.

15. The method according to claim 9, wherein processing the first row starts by sending a first camera frame image from a local means for processing to the cloud server or means for processing, and wherein processing the second row is meanwhile started on a second frame image, which is the image of frame number x+n where n>=1.

16. The method according to claim 9, wherein processing the first row starts by sending a first camera frame image from a local means for processing to the cloud server or means for processing, and wherein processing of the fourth row is meanwhile started on the local means for processing with the fourth frame image number x+q, q>=m+1.

17. The method according to claim 8, wherein instead of defining the facial landmark coordinates of the second frame image, which has a frame image number 2, the facial landmark coordinates of a first frame image, which has a frame image number 1, are used.

18. A system for training a neural network by adapting weight values of nodes of the neural network, the neural network having output nodes;
the system comprising:
 a store for digital images of a first data type being pairs of input- and target digital real images, a second data type being pairs of input- and target digital synthetic images, and a third data type being input unlabelled digital real images,
 wherein each image is represented by pixels, the pixels having pixel properties;
 the system comprising a processor for processing the digital images of the first data type, the second data type and the third data type;
 the processor being adapted to create one or more loss signals by:
  modifying each input image of the first, second and third data types to form modified digital images of the first, second and third data types,
  obtaining output values in the output nodes by processing pixels of the modified digital images through the neural network,
  obtaining loss signals
  for the first data type by using all output nodes,
  for the second data type by using at least one of the output nodes, and
  for the third data type by using at least one of the output nodes, so that the second and third data types are together using all of the output nodes;
 the processor being adapted to combine the loss signals from digital images of each of the first, second and third data types into a combined loss signal;
 the processor being adapted to update the weight values of the neural network by back propagating the combined loss signal through the neural network; and
 the processor being adapted to store the updated weight values.

19. The system according to claim 18, wherein the processor is additionally adapted: for each modified digital image,
 to process the modified digital image through the network using reverse modification to obtain in the output nodes a reversely modified digital image; and
 for each data type, to create a loss signal using the output nodes, and the pixel values of unmodified digital image.

20. A system for warping digital images, the system comprising means for processing and a non-volatile memory,
 the system being adapted to define facial landmarks of digital images; the system being adapted to receiving digital images;
 the means for processing being adapted to receive a frame image number x, to detect the image pixel coordinates of the facial landmarks on the image and to send the image pixel coordinates to a neural network,
 the neural network being adapted to generate a warp field;
 and to apply the warp field onto the frame image number x;
 to output the warped frame image number x on the display;
 and for at least one frame image number x+n, n>=1;
 to use the warp field obtained from frame image number x;
 and for at least one frame image number x+m, m>=n+1,
 by using the facial landmarks obtained from frame image number x+n.

* * * * *